(12) United States Patent
Takeda et al.

(10) Patent No.: US 9,239,462 B2
(45) Date of Patent: Jan. 19, 2016

(54) IMAGE DISPLAY DEVICE AND HEAD-MOUNTED IMAGE DISPLAY DEVICE

(71) Applicant: Seiko Epson Corporation, Tokyo (JP)

(72) Inventors: Takashi Takeda, Suwa (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 156 days.

(21) Appl. No.: 13/965,312

(22) Filed: Aug. 13, 2013

(65) Prior Publication Data

US 2014/0049831 A1 Feb. 20, 2014

(30) Foreign Application Priority Data

Aug. 17, 2012 (JP) .................................. 2012-180906

(51) Int. Cl.
*G02B 27/14* (2006.01)
*G02B 27/01* (2006.01)
*G02B 26/10* (2006.01)

(52) U.S. Cl.
CPC .......... *G02B 27/0172* (2013.01); *G02B 26/101* (2013.01); *G02B 2027/0118* (2013.01); *G02B 2027/0178* (2013.01)

(58) Field of Classification Search
CPC ............................... G02B 27/017; G02B 27/01
USPC .................................................. 359/630, 631
See application file for complete search history.

(56) References Cited

U.S. PATENT DOCUMENTS

| 7,724,210 B2 | 5/2010 | Sprague et al. |
| 2010/0225566 A1 | 9/2010 | Sato |
| 2011/0012874 A1 | 1/2011 | Kurozuka |
| 2011/0102874 A1* | 5/2011 | Sugiyama et al. ......... 359/205.1 |

FOREIGN PATENT DOCUMENTS

| EP | 1 688 777 A1 | 8/2006 |
| JP | 2007-178941 A | 7/2007 |
| JP | 2007-537465 A | 12/2007 |

OTHER PUBLICATIONS

Extended European Search Report for Application No. EP 13 18 0390 dated Nov. 26, 2013 (8 pages).

* cited by examiner

*Primary Examiner* — James Jones
(74) *Attorney, Agent, or Firm* — Harness, Dickey & Pierce, P.L.C.

(57) ABSTRACT

A head mounted image display device includes: a frame including a front section having a nose pad; a light transmitter supported by the front section and allowing visible light to pass therethrough; an optical scanner that receives signal light modulated according to an image signal and made incident thereon and that two-dimensionally scans the incident signal light toward the light transmitter; a half mirror on a surface on which the signal light from the optical scanner is incident and having a curved surface that reflects the signal light; and a condensing lens on an optical axis between the optical scanner and the half mirror and condensing the signal light from the optical scanner between the optical scanner and the half mirror to convert the signal light reflected by the half mirror into parallel light.

29 Claims, 12 Drawing Sheets

IMAGE DISPLAY DEVICE AND HEAD-MOUNTED IMAGE DISPLAY DEVICE

BACKGROUND

1. Technical Field

The present invention relates to an image display device and a head-mounted image display device.

2. Related Art

One known image display device is a head mounted display (a head-mounted image display device) that is used while mounted on the head of an observer and configured to display, as a virtual image, an image visually recognized by the observer (see, for example, JP-T-2007-537465).

Known head mounted displays include a light source configured to emit light modulated according to image information, a scanning optical system configured to scan the light from the light source, and a curved half mirror configured to reflect the light from the scanning optical system to the eyes of an observer (see, for example, JP-T-2007-537465).

Thus, in the head mounted display of the related art, the light from the scanning optical system is directly incident on the curved half mirror. Since the light from the scanning optical system is parallel light, the light reflected by the curved half mirror is not parallel light.

Therefore, the light is not appropriately imaged on the retinas of the observer and the display quality of the image is deteriorated, for example, by the blurring of the image that occurs when the image is viewed as a whole.

SUMMARY

An advantage of some aspects of the invention is to provide an image display device and a head-mounted image display device that can reduce the blurring of an entire image compared with the related art and improve the display quality of an image visually recognized by an observer.

An aspect of the disclosure is directed to an image display device mountable on the head of an observer, the image display device including: a frame including a front section including a nose pad section; a light transmitting section supported by the front section and allowing visible light to pass therethrough; an optical scanning section receiving signal light modulated according to an image signal and made incident thereon and two-dimensionally scanning the incident signal light toward the light transmitting section; a half mirror located on a surface on which the signal light from the optical scanning section of the light transmitting section is made incident and having a curved surface that reflects the signal light from the optical scanning section; and a condensing lens located on an optical axis between the optical scanning section and the half mirror and condensing the signal light from the optical scanning section between the optical scanning section and the half mirror to convert the signal light reflected by the half mirror into parallel light.

With the image display device configured in this way, since the signal light from the optical scanning section is condensed between the optical scanning section and the light transmitting section by the condensing lens, it is possible to convert the light reflected by the curved half mirror into parallel light. Consequently, it is possible to guide the parallel signal light to a pupil position of the eye of the observer and image the signal light on the retina of the observer. Therefore, it is possible to improve the display quality of an image visually recognized by the observer.

The observer can visually recognize a virtual image (an image) formed by the signal light while visually recognizing an external image. That is, it is possible to realize a see-through type head mounted display.

In the image display device according to the aspect of the disclosure, it is preferable that the optical scanning section is located on the nose pad side of the front section and on a side nearer to the center of the front section than an optical axis of the light reflected by the half mirror.

Consequently, since the optical scanning section is arranged to be located further on the nose side than the eye of the observer during use, it is possible to prevent a portion projecting to the lateral side with respect to the face of the observer from being formed. Since the half mirror is located in front of the eye of the observer and on a farther side with respect to the observer than the optical scanning section during use, it is possible to prevent a portion projecting to the front side with respect to the face of the observer from being formed. Therefore, it is possible to reduce the weight felt by the observer.

It is preferable that the image display device according to the aspect of the disclosure further includes an optical fiber that guides the signal light to the optical scanning section.

Consequently, the degree of freedom of a setting position of a signal-light generating section is increased.

It is preferable that the image display device according to the aspect of the disclosure further includes: a lens that adjusts a radiation angle of the signal light emitted from the optical fiber; and a condensing-position changing section that moves an end on the lens side of the optical fiber in an axis direction of the optical fiber to change a condensing position of the signal light between the optical scanning section and the half mirror.

Consequently, it is possible to adjust, with a relatively simple and small configuration, an imaging position of scanning light formed by scanning the signal light with the optical scanning section and optimize an image visually recognized by the observer.

It is preferable that the image display device according to the aspect of the disclosure further includes a signal-light generating section that generates the signal light, the frame includes a temple section connected to the front section and an end cover section, which is an end of the temple section, and the signal-light generating section is provided in the end cover section.

Consequently, it is possible to make a weight balance of the image display device excellent.

In the image display device according to the aspect of the disclosure, it is preferable that the signal-light generating section includes a plurality of light sources that emit lights having different colors from one another and a combining section that combines the lights from the plurality of light sources, and the signal-light generating section emits the lights combined by the combining section as the signal light.

Consequently, it is possible to display a multi-colored image (virtual image).

In the image display device according to the aspect of the disclosure further includes a housing that includes the condensing lens, the optical scanning section is housed in the housing.

Consequently, it is possible to suppress the number of components and attain a reduction in size of the device.

In the image display device according to the aspect of the disclosure, it is preferable that the optical scanning section is attached to the frame and is movable with respect to the half mirror.

Consequently, it is possible to perform adjustment in the eye width direction of an imaging position of the scanning light formed by scanning the signal light with the optical scanning section.

In the image display device according to the aspect of the disclosure, it is preferable that the optical scanning section includes an optical scanner that swings a movable section, which includes a light reflecting section having light reflectivity, around each of two orthogonal axes.

Consequently, it is possible to attain a reduction in size and a reduction in weight of the optical scanning section.

In the image display device according to the aspect of the disclosure, it is preferable that the optical scanning section includes a gimbal structure including the movable section and a frame body section surrounding the movable section.

Consequently, the optical scanner is further reduced in size. As a result, it is possible to further reduce the optical scanning section in size.

In the image display device according to the aspect of the disclosure, it is preferable that the optical scanning section includes a light reflection plate provided in the movable section and in which the light reflecting section having an area larger than the area of the movable section is formed.

Consequently, the optical scanner is further reduced in size. As a result, it is possible to further reduce the optical scanning section in size.

In the image display device according to the aspect of the disclosure, it is preferable that the curved surface that reflects the light from the optical scanning section of the half mirror is a concave surface.

Consequently, it is possible to attain a reduction in size of the image display device and improve designability of the image display device. It is possible to easily reflect, with the reflecting section, the signal light from the optical scanning section to the eye of the observer during use.

In the image display device according to the aspect of the disclosure, it is preferable that the half mirror is a diffraction grating.

Consequently, it is possible to impart various optical characteristics to the diffraction grating, reduce the number of components of an optical system, and improve the degree of design freedom.

In the image display device according to the aspect of the disclosure, it is preferable that the optical scanning section and the half mirror are movable with respect to the frame as a unit.

Consequently, it is possible to adjust an imaging position in the eye width direction of the observer while retaining a positional relation between the optical scanning section and the reflecting section.

Another aspect of the disclosure is directed to an image display device used while being mounted on the head of an observer, the image display device including: an optical scanning section two-dimensionally scanning signal light modulated according to an image signal; a reflecting section located in front of the eye of the observer during use and having a curved surface that reflects the signal light from the optical scanning section toward the eye of the observer; and a condensing lens located on an optical axis between the optical scanning section and the reflecting section and condensing the signal light from the optical scanning section between the optical scanning section and the reflecting section to convert the signal light reflected by the reflecting section into parallel light.

With the image display device configured in this way, since the signal light from the optical scanning section is condensed between the optical scanning section and the reflecting section by the condensing lens, it is possible to convert the light reflected by the curved reflecting section into parallel light. Consequently, it is possible to guide the parallel signal light to a pupil position of the eye of the observer and image the signal light on the retina of the observer. Therefore, it is possible to improve the display quality of an image visually recognized by the observer.

In the image display device according to the aspect of the disclosure, it is preferable that the optical scanning section is arranged in a position closer to the observer during use than the reflecting section and in a position between both the eyes of the observer during use.

Consequently, since the optical scanning section is arranged to be located further on the nose side than the eye of the observer during use, it is possible to prevent a portion projecting to the lateral side with respect to the face of the observer from being formed. Since the reflecting section is located in front of the eye of the observer and on a farther side with respect to the observer than the optical scanning section during use, it is possible to prevent a portion projecting to the front side with respect to the face of the observer from being formed. Therefore, it is possible to reduce the weight felt by the observer.

It is preferable that the image display device according to the aspect of the disclosure further includes an optical fiber that guides guide the signal light to the optical scanning section.

Consequently, the degree of freedom of a setting position of a signal-light generating section is increased.

It is preferable that the image display device according to the aspect of the disclosure further includes: a lens that adjusts a radiation angle of the signal light emitted from the optical fiber; and a condensing-position changing section that moves an end on the lens side of the optical fiber in an axis direction of the optical fiber to change a condensing position of the signal light between the optical scanning section and the reflecting section.

Consequently, it is possible to adjust, with a relatively simple and small configuration, an imaging position of scanning light formed by scanning the signal light with the optical scanning section and optimize an image visually recognized by the observer.

It is preferable that the image display device according to the aspect of the disclosure further includes a signal-light generating section that generates the signal light, and the signal-light generating section is arranged in a position on the opposite side of the eye with respect to the ear of the observer during the use.

Consequently, it is possible to make a weight balance of the image display device excellent.

In the image display device according to the aspect of the disclosure, it is preferable that the signal-light generating section includes a plurality of light sources that emit lights having different colors from one another and a combining section that combines the lights from the plurality of light sources, and the signal-light generating section emits the lights combined by the combining section as the signal light.

Consequently, it is possible to display a multi-colored image (virtual image).

In the image display device according to the aspect of the disclosure further includes a housing that includes the condensing lens, the optical scanning section is housed in the housing.

Consequently, it is possible to suppress the number of components and attain a reduction in size of the device.

It is preferable that the image display device according to the aspect of the disclosure further includes a frame including a nose pad section that comes into contact with the nose of the observer during use, and the optical scanning section is attached to the frame and is movable with respect to the reflecting section.

Consequently, it is possible to perform adjustment in the eye width direction of an imaging position of the scanning light formed by scanning the signal light with the optical scanning section.

In the image display device according to the aspect of the disclosure, it is preferable that the optical scanning section includes an optical scanner that swings a movable section, which includes a light reflecting section having light reflectivity, around each of two orthogonal axes.

Consequently, it is possible to attain a reduction in size and a reduction in weight of the optical scanning section.

In the image display device according to the aspect of the disclosure, it is preferable that the optical scanning section includes a gimbal structure including the movable section and a frame body section surrounding the movable section.

Consequently, the optical scanner is further reduced in size. As a result, it is possible to further reduce the optical scanning section in size.

In the image display device according to the aspect of the disclosure, it is preferable that the optical scanning section includes a light reflection plate provided in the movable section and in which the light reflecting section having an area larger than the area of the movable section is formed.

Consequently, the optical scanner is further reduced in size. As a result, it is possible to further reduce the optical scanning section in size.

In the image display device according to the aspect of the disclosure, it is preferable that the reflecting section is curved from the nose side toward the ear side of the observer during use.

Consequently, it is possible to attain a reduction in size of the image display device and improve designability of the image display device. It is possible to easily reflect, with the reflecting section, the signal light from the optical scanning section to the eye of the observer during use.

In the image display device according to the aspect of the disclosure, it is preferable that the reflecting section reflects the signal light from the optical scanning section and transmits external light traveling from an outer side of the reflecting section to the eye of the observer during use.

Consequently, the observer can visually recognize a virtual image (an image) formed by the signal light while visually recognizing an external image. That is, it is possible to realize a see-through type head mounted display.

In the image display device according to the aspect of the disclosure, it is preferable that the reflecting section includes a transparent substrate that transmits the external light and a diffraction grating supported by the transparent substrate and reflecting the signal light from the optical scanning section.

Consequently, it is possible to impart various optical characteristics to the diffraction grating, reduce the number of components of an optical system, and improve the degree of design freedom.

In the image display device according to the aspect of the disclosure, it is preferable that the optical scanning section and the reflecting section are movable as a unit in the eye width direction of the observer during use.

Consequently, it is possible to adjust an imaging position in the eye width direction of the observer while retaining a positional relation between the optical scanning section and the reflecting section.

Still another aspect of the disclosure is directed to a head-mounted image display device including: a light transmitting section allowing visible light to pass therethrough; an optical scanning section receiving signal light modulated according to an image signal and made incident thereon and two-dimensionally scanning the incident signal light toward the light transmitting section; a half mirror located on a surface on which the signal light from the optical scanning section of the light transmitting section is made incident and having a curved surface that reflects the signal light from the optical scanning section; and a condensing lens located on an optical axis between the optical scanning section and the half mirror and condensing the signal light from the optical scanning section between the optical scanning section and the half mirror to convert the signal light reflected by the half mirror into parallel light.

With the image display device configured in this way, since the signal light from the optical scanning section is condensed between the optical scanning section and the light transmitting section by the condensing lens, it is possible to convert the light reflected by the curved half mirror into parallel light. Consequently, it is possible to guide the parallel signal light to a pupil position of the eye of the observer and image the signal light on the retina of the observer. Therefore, it is possible to improve the display quality of an image visually recognized by the observer.

The observer can visually recognize a virtual image (an image) formed by the signal light while visually recognizing an external image. That is, it is possible to realize a see-through type head mounted display.

Yet another aspect of the disclosure is directed to a head-mounted image display device including: a light transmitting section allowing visible light to pass therethrough; an optical scanning section receiving signal light modulated according to an image signal and made incident thereon and two-dimensionally scanning the incident signal light toward the light transmitting section; a half mirror located on a surface on which the signal light from the optical scanning section of the light transmitting section is made incident and having a curved surface that reflects the signal light from the optical scanning section; and an image-formation-point adjusting section located on an optical axis between the optical scanning section and the half mirror and adjusting an image formation point of the signal light from the optical scanning section located between the optical scanning section and the half mirror to convert the signal light reflected by the half mirror into parallel light.

With the image display device configured in this way, since the image formation point of the signal light from the optical scanning section located between the optical scanning section and the light transmitting section is adjusted by the image-formation-point adjusting section, it is possible to convert the light reflected by the curved half mirror into parallel light. Consequently, it is possible to guide the parallel signal light to a pupil position of the eye of the observer and image the signal light on the retina of the observer. Therefore, it is possible to improve the display quality of an image visually recognized by the observer.

The observer can visually recognize a virtual image (an image) formed by the signal light while visually recognizing an external image. That is, it is possible to realize a see-through type head mounted display.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Preferred embodiments of an image display device and a head-mounted image display device will be explained below with reference to the accompanying drawings.

First Embodiment

Figure 1:
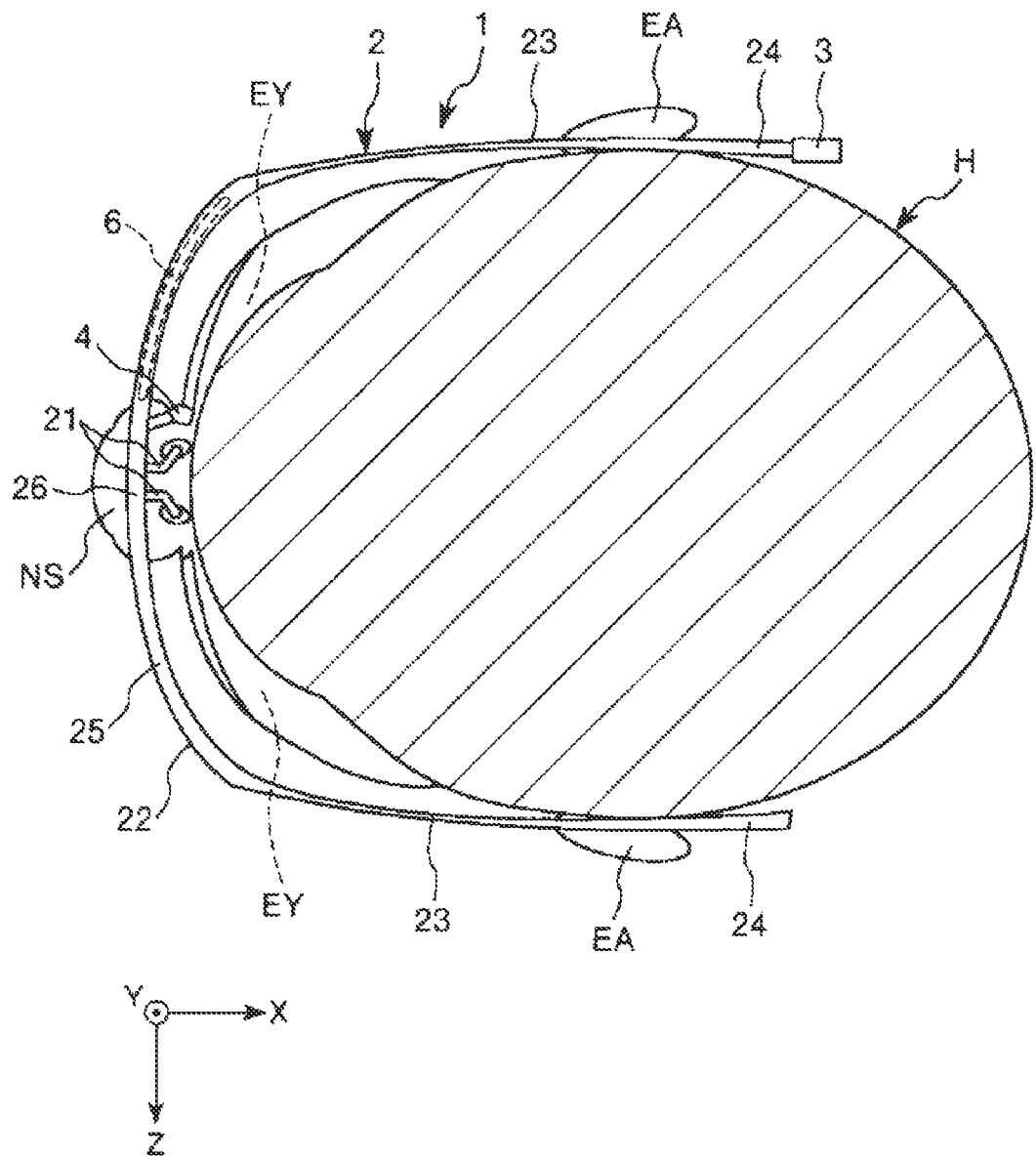
FIG. 1 is a diagram showing a schematic configuration of an image display device (a head mounted display) according to a first embodiment.
Figure 2:
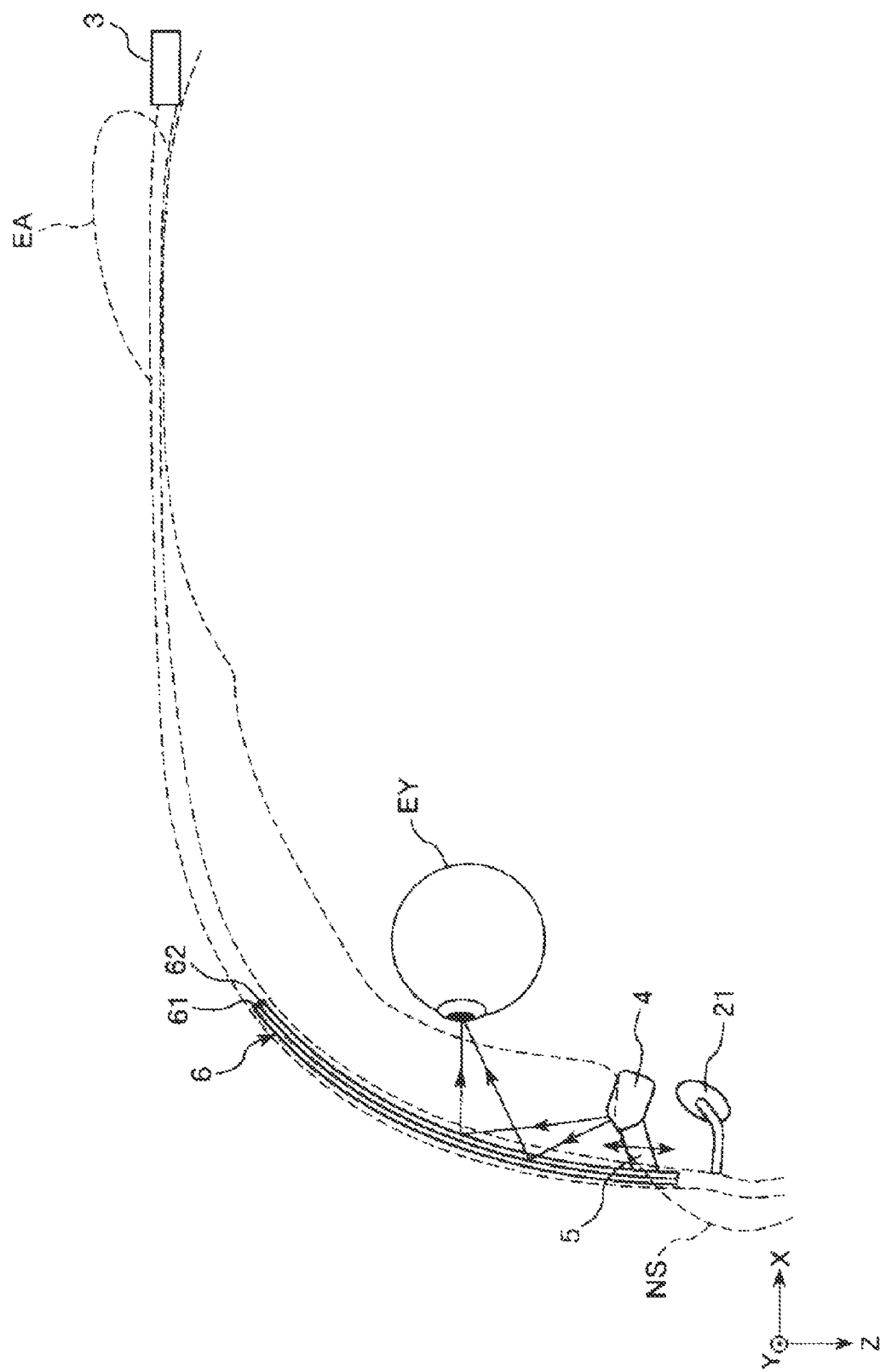
FIG. 2 is a partially enlarged view of the image display device shown in FIG. 1.
Figure 3:
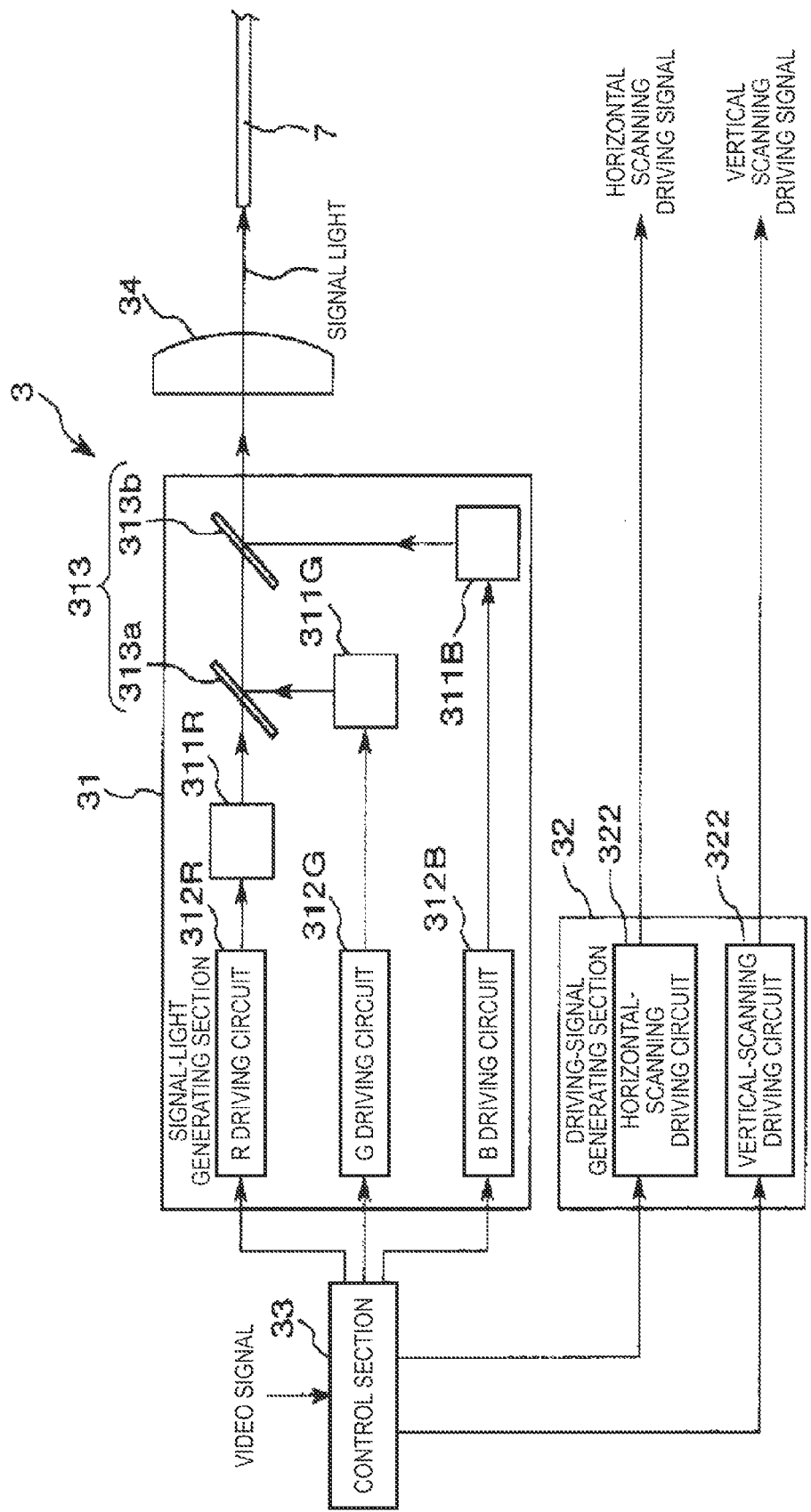
FIG. 3 is a schematic configuration diagram of a signal generating section shown in FIG. 2.
Figure 4A:
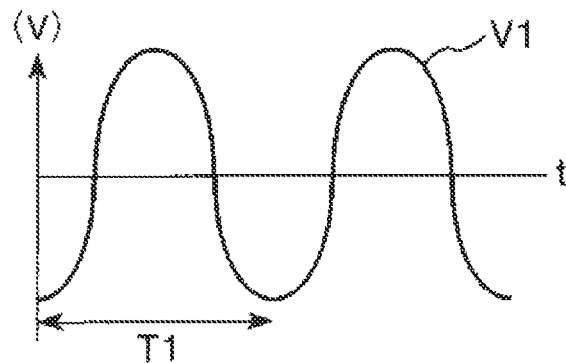
FIGS. 4A and 4B are diagrams showing examples of driving signals of a driving-signal generating section shown in FIG. 3.
Figure 4B:
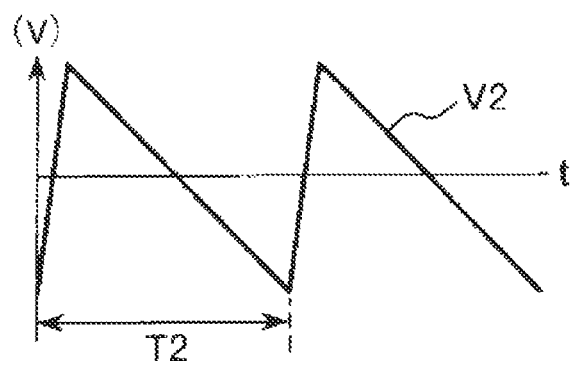
Figure 5:
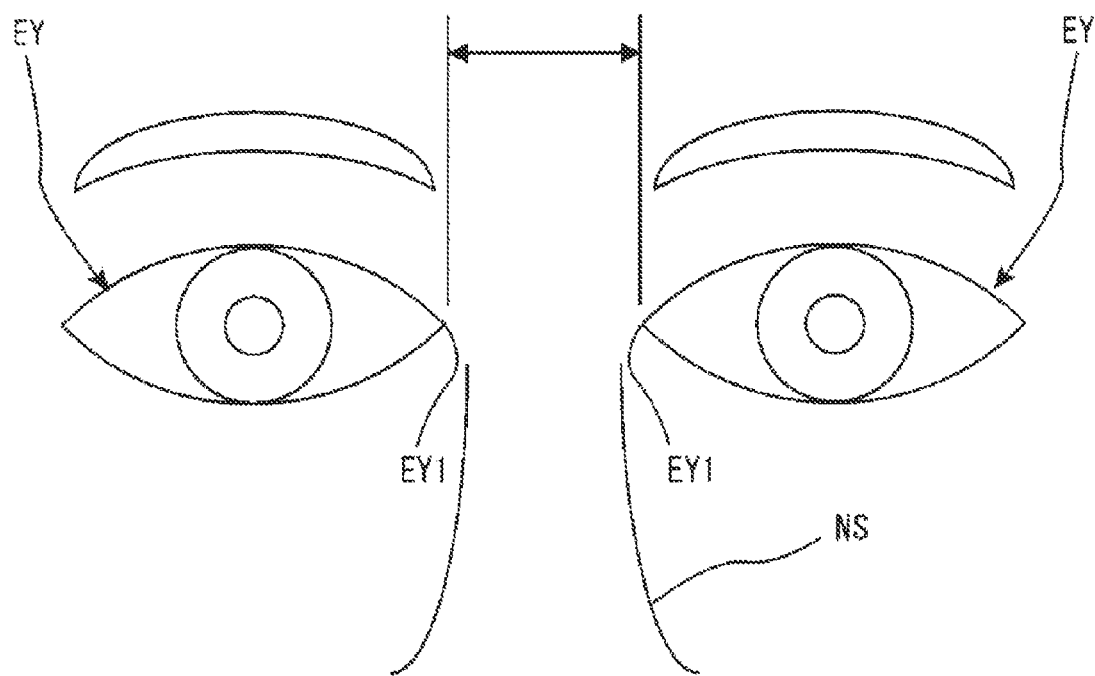
FIG. 5 is a diagram for explaining a position during use of a scanning-light emitting section shown in FIGS. 1 and 2.
Figure 6:
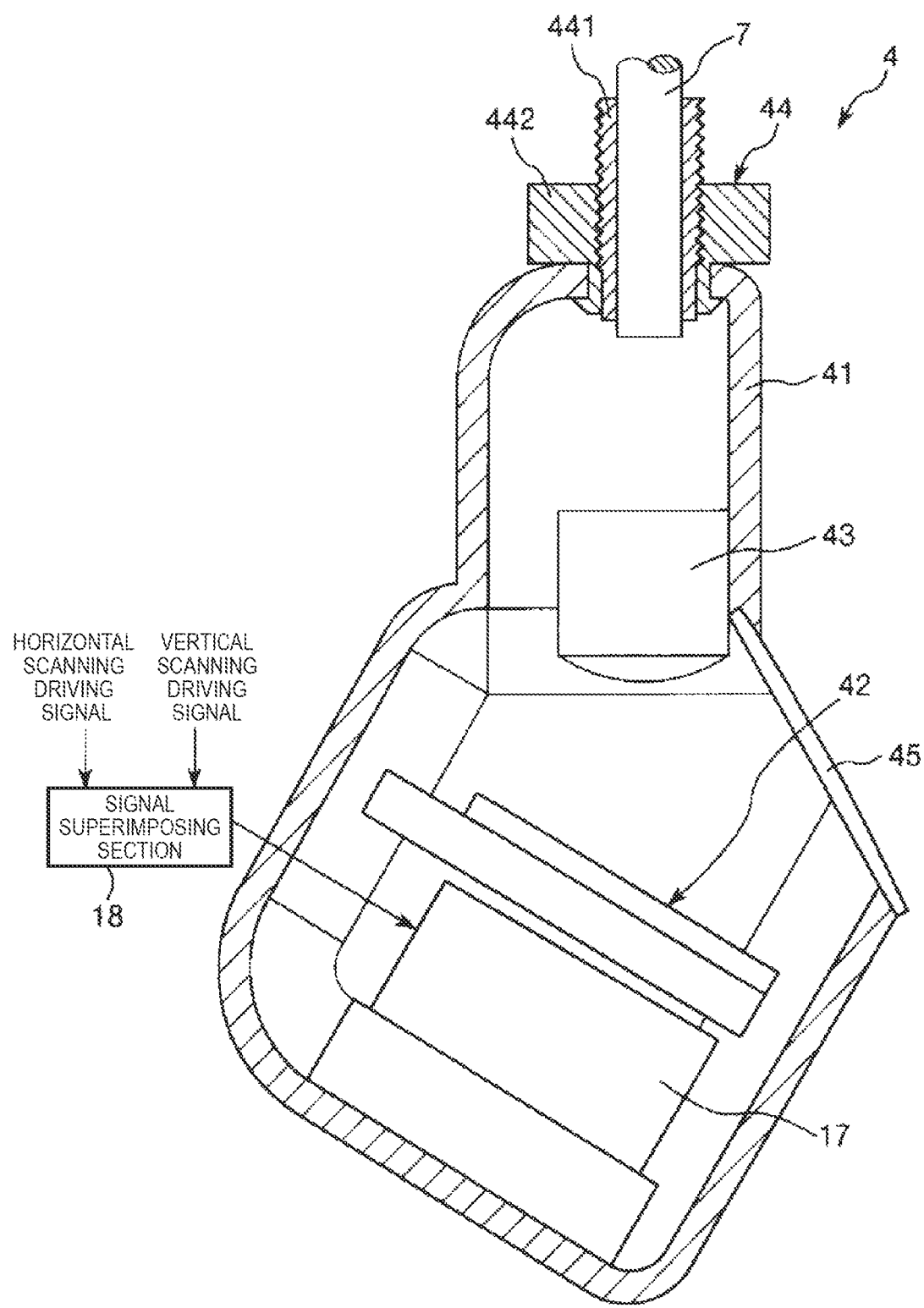
FIG. 6 is a schematic configuration diagram of an optical scanning section shown in FIG. 2.
Figure 7:
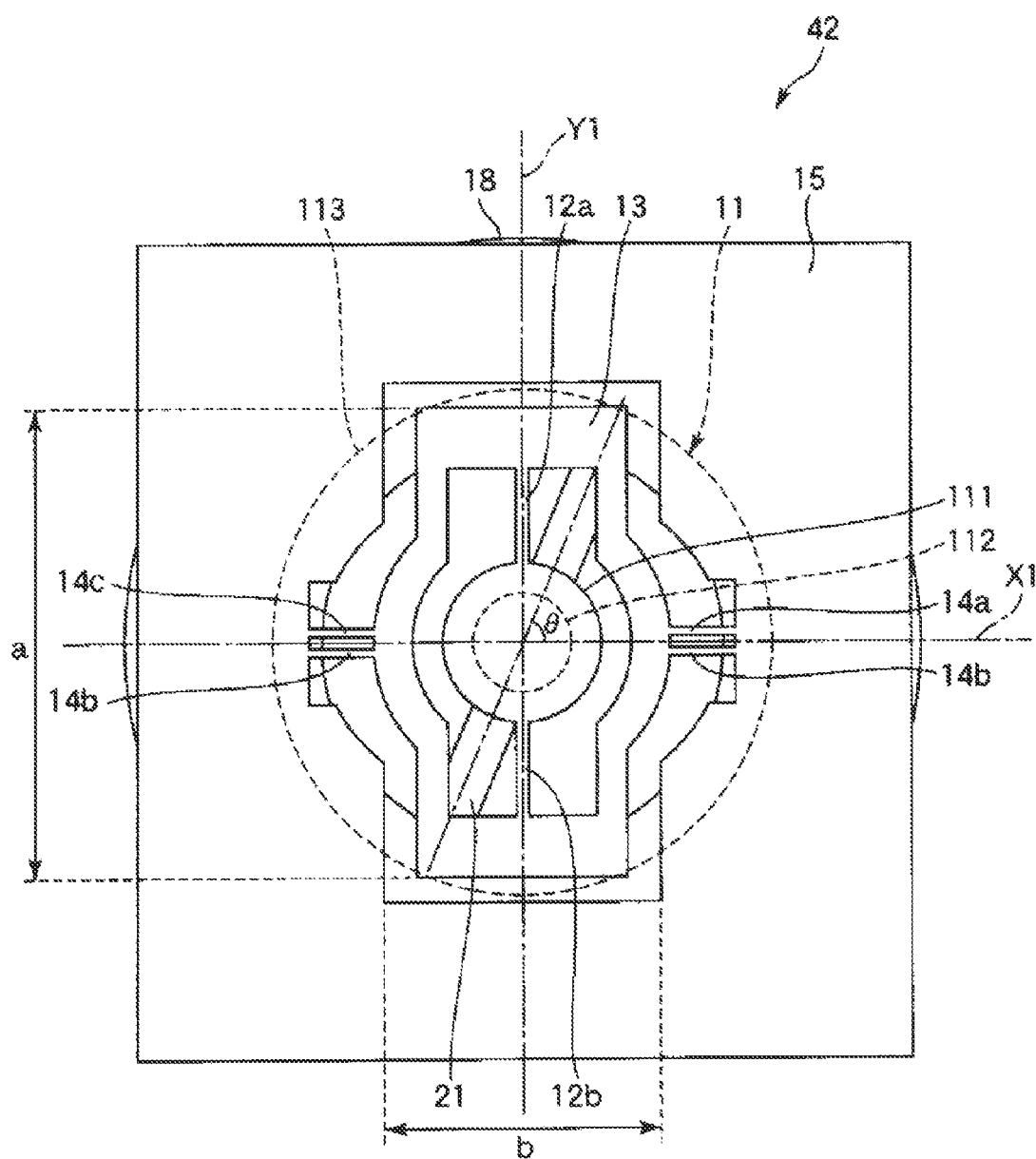
FIG. 7 is a plan view of an optical scanner shown in FIG. 6.
Figure 8:
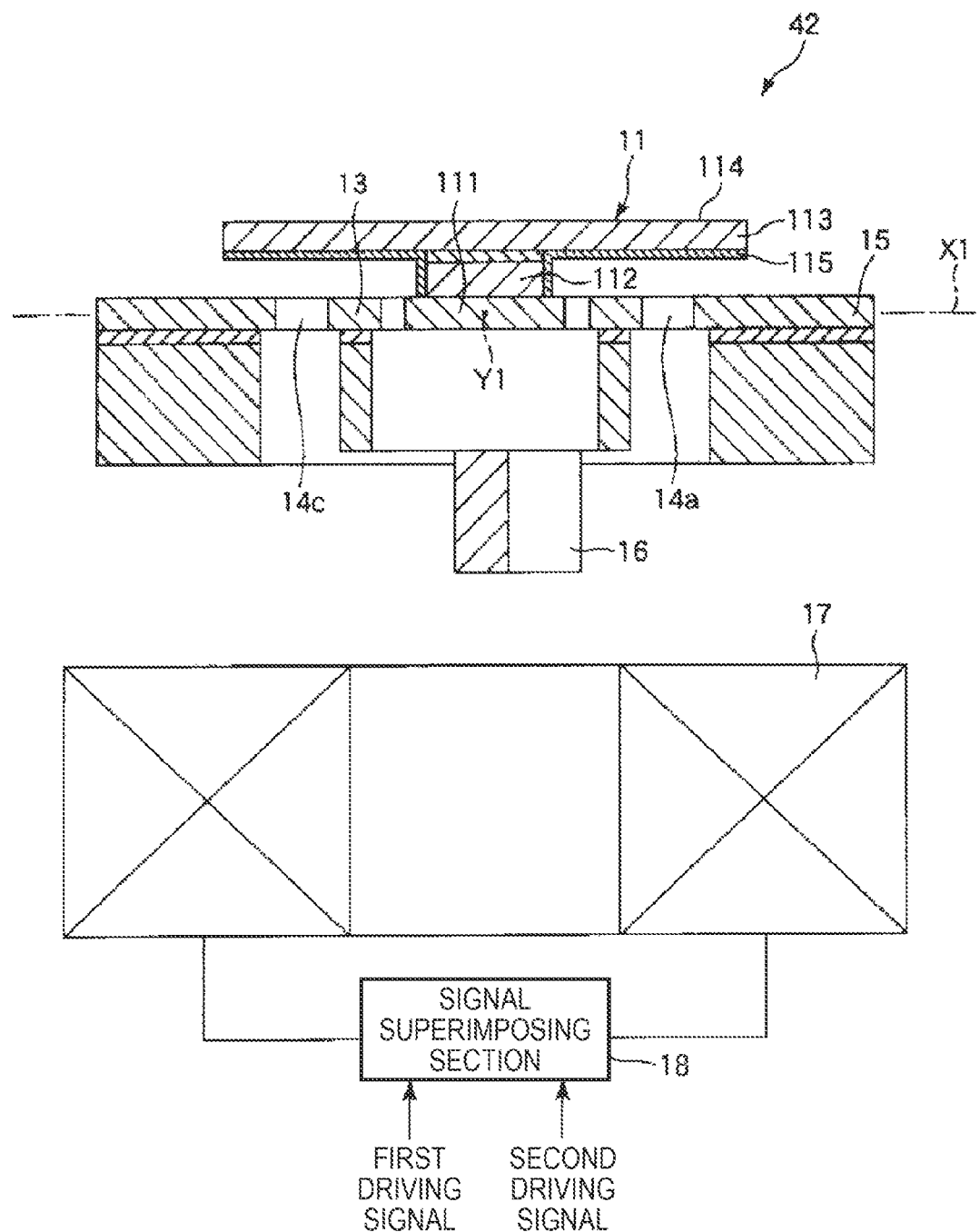
FIG. 8 is a sectional view (a sectional view taken along an X axis) of the optical scanner shown in FIG. 6.
Figure 9:
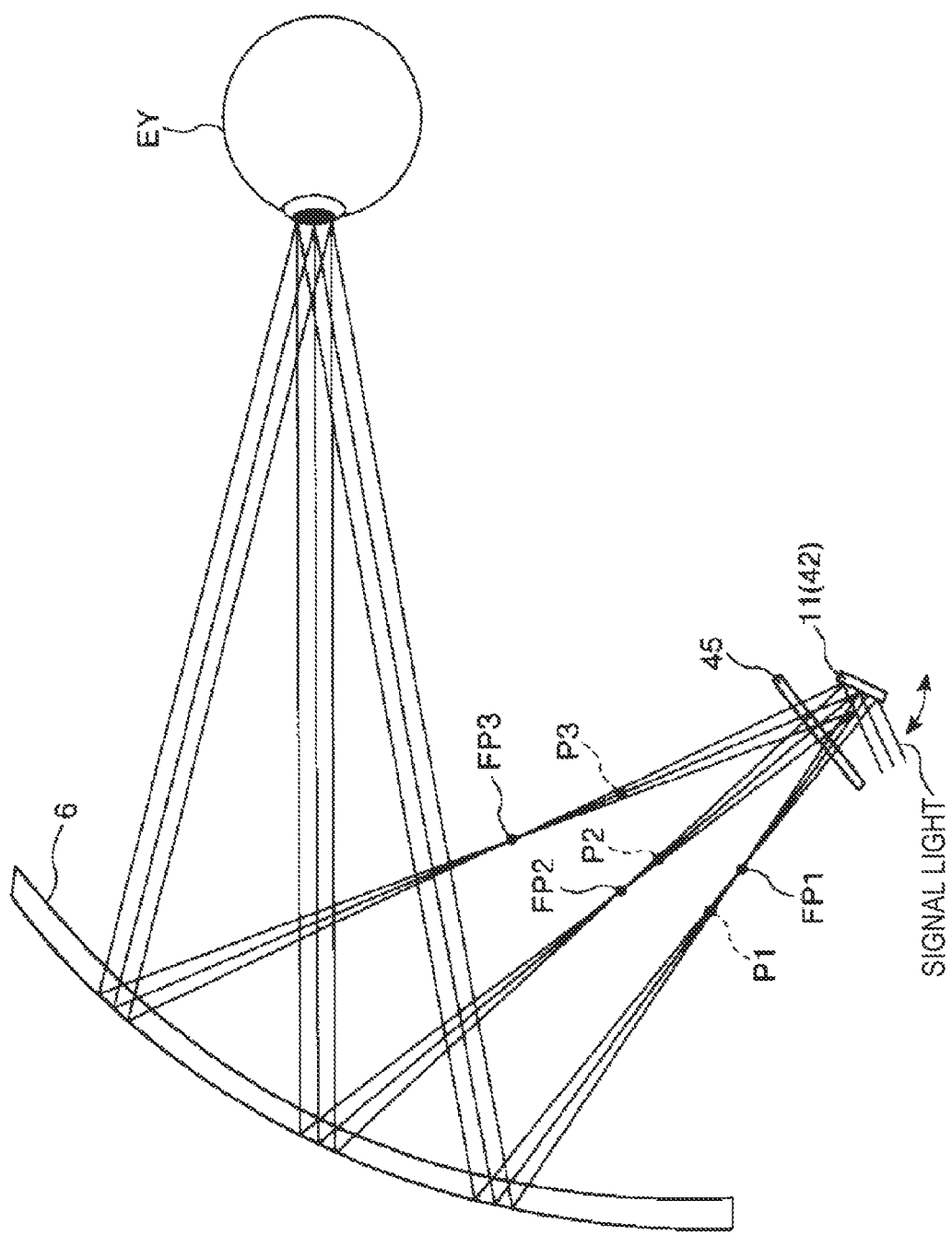
FIG. 9 is a diagram for explaining a condensing lens (an image-formation-point adjusting section) shown in FIG. 6.
Figure 10:
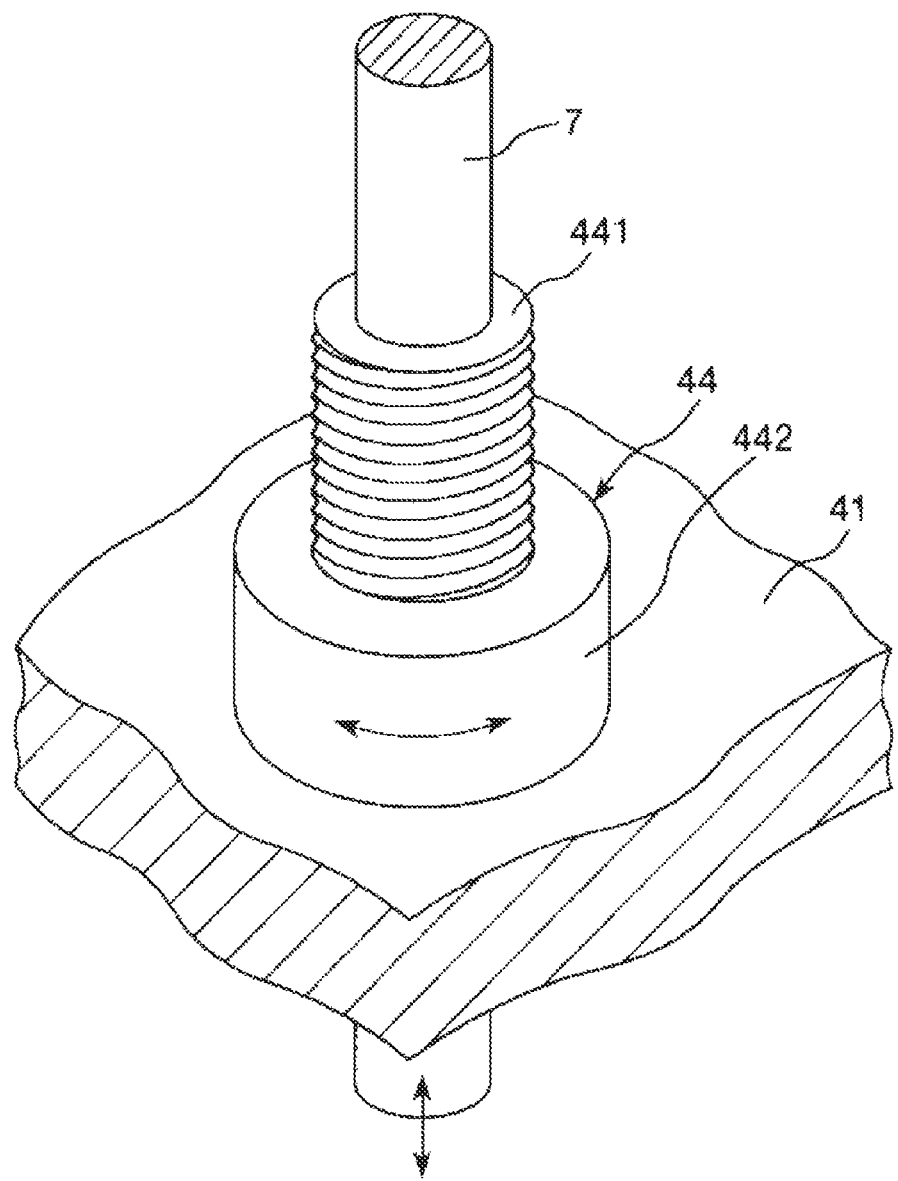
FIG. 10 is a diagram for explaining a condensing-position changing section shown in FIG. 6.

FIG. 1 is a diagram showing a schematic configuration of an image display device (a head mounted display) according to a first embodiment. FIG. 2 is a partially enlarged view of the image display device shown in FIG. 1. FIG. 3 is a schematic configuration diagram of a signal generating section shown in FIG. 2. FIGS. 4A and 4B are diagrams showing examples of driving signals of a driving-signal generating section shown in FIG. 3. FIG. 5 is a diagram for explaining a position during use of a scanning-light emitting section shown in FIGS. 1 and 2. FIG. 6 is a schematic configuration diagram of an optical scanning section shown in FIG. 2. FIG. 7 is a plan view of an optical scanner shown in FIG. 6. FIG. 8 is a sectional view (a sectional view taken along an X axis) of the optical scanner shown in FIG. 6. FIG. 9 is a diagram for explaining a condensing lens (an image-formation-point adjusting section) shown in FIG. 6. FIG. 10 is a diagram for explaining a condensing-position changing section shown in FIG. 6.

In FIGS. 1 and 2, for convenience of explanation, an X axis, a Y axis, and a Z axis are shown as three axes orthogonal to one another. A distal end side of an arrow shown in the figures is referred to as "+ side" and a proximal end side is referred to as "− side". A direction parallel to the X axis is referred to as "X-axis direction", a direction parallel to the Y axis is referred to as "Y-axis direction", and a direction parallel to the Z axis is referred to as "Z-axis direction". The X axis, the Y axis, and the Z axis are set such that, when an image display device 1 explained below is mounted on a head H of an observer, the X-axis direction is the front back direction of the head H, the Y-axis direction is the up down direction of the head H, and the Z-axis direction is the left right direction of the head H.

As shown in FIG. 1, the image display device 1 in this embodiment is a head mounted display (a head-mounted image display device) having an external appearance like eyeglasses. The image display device 1 is used while being mounted on the head H of the observer to cause the observer to visually recognize an image by a virtual image in a state in which the image is superimposed on an external image.

The image display device 1 includes a frame 2, a signal generating section 3, a scanning-light emitting section 4, and a reflecting section 6.

In the image display device 1, the signal generating section 3 generates signal light modulated according to image information. The scanning-light emitting section 4 two-dimensionally scans the signal light and emits scanning light. The reflecting section 6 reflects the scanning light to an eye EY of the observer. Consequently, it is possible to cause the observer to visually recognize a virtual image corresponding to the image information.

The image display device 1 forms each of a virtual image for the right eye and a virtual image for the left eye. However, for convenience of explanation, in the respective figures, components for forming the virtual image for the right eye are representatively shown. Components for forming the virtual image for the left eye are the same as the components for forming the virtual image for the right eye. Therefore, the components for forming the virtual image for the left eye are not shown in the figure.

The sections of the image display device 1 are explained in detail below in order.

Frame

As shown in FIGS. 1 and 2, the frame 2 is formed in a shape like an eyeglass frame and has a function of supporting the signal generating section 3, the scanning-light emitting section 4, and the reflecting section 6.

The frame 2 includes, as shown in FIG. 1, a front section 22 configured to support the scanning-light emitting section 4, the reflecting section 6, and a nose pad section 21, a pair of temple sections (bow sections) 23 connected to the front section 22 and set in contact with the ears of the observer, and end cover sections 24, which are ends opposite to the front section 22 of the temple sections 23. The nose pad section 21 is in contact with a nose NS of the observer during use and supports the image display device 1 with respect to the head of the observer. The front section 22 includes a rim section 25 and a bridge section 26.

The nose pad section 21 is configured to be capable of adjusting the position of the frame 2 with respect to the observer during use.

The shape of the frame 2 is not limited to the shape shown in the figure as long as the frame 2 can be mounted on the head H of the observer.

Signal Generating Section

As shown in FIGS. 1 and 2, the signal generating section 3 is attached to one end cover section 24 of the frame 2.

That is, the signal generating section 3 is arranged on the opposite side of the eye EY with respect to an ear EA of the observer during use. Consequently, it is possible to make a weight balance of the image display device excellent.

The signal generating section 3 has a function of generating signal light scanned by an optical scanning section 42 of a scanning-light emitting section 4 explained below and a function of generating a driving signal for driving the optical scanning section 42.

The signal generating section 3 includes, as shown in FIG. 3, a signal-light generating section 31, a driving-signal generating section 32, a control section 33, and a lens 34.

The signal-light generating section 31 generates signal light scanned (optically scanned) by the optical scanning section 42 (an optical scanner) of the scanning-light emitting section 4.

The signal-light generating section 31 includes a plurality of light sources 311R, 311G, and 311B having different wavelengths, a plurality of driving circuits 312R, 312G, and 312B, and a light combining section (a combining section) 313.

The light source 311R (an R light source) emits red light, the light source 311G (a G light source) emits green light, and the light source 311B (a B light source) emits blue light. By using the three color lights, it is possible to display a full-color image.

The light sources 311R, 311G, and 311B are not specifically limited. For example, a laser diode or an LED can be used.

The light sources 311R, 311G, and 311B are respectively electrically connected to the driving circuits 312R, 312G, and 312B.

The driving circuit 312R has a function of driving the light source 311R. The driving circuit 312G has a function of driving the light source 311G. The driving circuit 312B has a function of driving the light source 311B.

The three (three color) lights emitted from the light sources 311R, 311G, and 311B driven by the driving circuits 312R, 312G, and 312B are made incident on the light combining section 313.

The light combining section 313 combines lights from the plurality of light sources 311R, 311G, and 311B. Consequently, it is possible to reduce the number of optical fibers for transmitting the signal light generated by the signal-light generating section 31 to the scanning-light emitting section 4. Therefore, in this embodiment, it is possible to transmit the signal light from the signal generating section 3 to the scanning-light emitting section 4 via one optical fiber 7 provided along the temple section of the frame 2.

In this embodiment, the light combining section 313 includes two dichroic mirrors 313a and 313b.

The dichroic mirror 313a has a function of transmitting the red light and reflecting the green light. The dichroic mirror 313b has a function of transmitting the red light and the green light and reflecting the blue light.

By using the dichroic mirrors 313a and 313b, the three color lights, i.e., the red light, the green light, and the blue light from the light sources 311R, 311G, and 311B are combined to form signal light.

In this embodiment, the light sources 311R, 311G, and 311B are arranged to equalize optical path lengths for the red light, the green light, and the blue light from the light sources 311R, 311G, and 311B.

The light combining section 313 is not limited to the configuration including the dichroic mirrors explained above and may be configured by, for example, an optical waveguide and an optical fiber.

The signal light generated by the signal-light generating section 31 is input to the optical fiber 7 via the lens 34. The signal light is transmitted to the optical scanning section 42 of the scanning-light emitting section 4 via the optical fiber 7.

The optical fiber 7 that guides the signal light generated by the signal-light generating section 31 to the optical scanning section 42 is used in this way. Consequently, the degree of freedom of a setting position of the signal-light generating section 31 increases.

The lens 34 condenses the signal light generated by the signal-light generating section 31 in order to input the signal light to the optical fiber 7. The lens 34 is only provided if needed and can be omitted. The signal light can also be input to the optical fiber 7 by, for example, providing lenses between the light sources 311R, 311G, and 311B and the light combining section 313 instead of the lens 34.

The driving-signal generating section 32 generates a driving signal for driving the optical scanning section 42 (the optical scanner) of the scanning-light emitting section 4.

The driving-signal generating section 32 includes a driving circuit 321 (a first driving circuit) configured to generate a first driving signal used for scanning in a first direction of the optical scanning section 42 (horizontal scanning) and a driving circuit 322 (a second driving circuit) configured to generate a second driving signal used for scanning in a second direction orthogonal to the first direction of the optical scanning section 42 (vertical scanning).

For example, the driving circuit 321 generates a first driving signal V1 (a voltage for horizontal scanning) that cyclically changes at a cycle T1 as shown in FIG. 4A. The driving circuit 322 generates a second driving signal V2 (a voltage for vertical scanning) that cyclically changes at a cycle T2 different from the cycle T1 as shown in FIG. 4B.

The first driving signal and the second driving signal are explained in detail below.

The driving-signal generating section 32 is electrically connected to the optical scanning section 42 of the scanning-light emitting section 4 via a signal line (not-shown). The driving signals (the first driving signal and the second driving signal) generated by the driving-signal generating section 32 are input to the optical scanning section 42 of the scanning-light emitting section 4.

The driving circuits 312R, 312G, and 312B of the signal-light generating section 31 and the driving circuits 321 and 322 of the driving-signal generating section 32 explained above are electrically connected to the control section 33.

The control section 33 has a function of controlling the driving of the driving circuits 312R, 312G, and 312B of the signal-light generating section 31 and the driving circuits 321 and 322 of the driving-signal generating section 32 on the basis of a video signal (an image signal).

Consequently, the signal-light generating section generates signal light modulated according to image information and the driving-signal generating section 32 generates a driving signal corresponding to the image information.

Scanning-Light Emitting Section

As shown in FIGS. 1 and 2, the scanning-light emitting section 4 is attached in the vicinity of the bridge section of the frame 2 explained above (in other words, near the center of the front section).

That is, the scanning-light emitting section 4 is arranged to be located further on the nose NS side than the eye EY side of the observer during use. In other words, the scanning-light emitting section 4 is located between both the eyes EY of the observer when viewed from the front of the observer during use. "Between both the eyes EY" can be considered "between inner corners of eyes EY1 of both the eyes EY" as shown in FIG. 5. Further, in other words, the scanning-light emitting section 4 is located further on the bridge section side (i.e., the center side of the front section) than the position of an optical axis of signal light reflected by the reflecting section 6. Consequently, it is possible to prevent a portion projecting to the lateral side with respect to the face of the observer from being formed on the image display device 1.

The scanning-light emitting section 4 is attached on the inner side of the frame 2. That is, the scanning-light emitting section 4 is arranged on the observer side (i.e., the nose pad section 21 side of the front section 22) during use with respect to the reflecting section 6. Consequently, it is possible to prevent a portion projecting to the front side with respect to the face of the observer from being formed on the image display device 1.

The scanning-light emitting section 4 is attached to the frame 2 in a position different from the nose pad section 21 via a moving mechanism 5. The moving mechanism 5 is configured to be capable of moving the scanning-light emitting section 4 in a direction along the Z axis with respect to the frame 2. Therefore, the scanning-light emitting section 4 is movable in the direction along the Z axis with respect to the reflecting section 6. Consequently, it is possible to perform adjustment in the eye width direction of an imaging position of a scanning light formed by scanning signal light (a position where the entire scanning light spreading in the horizontal direction and the vertical direction is imaged) independently from position adjustment of the nose pad section 21.

The scanning-light emitting section 4 includes, as shown in FIG. 6, a housing 41, an optical scanning section 42, a lens (a coupling lens) 43, a condensing-position changing mechanism (a condensing-position changing section) 44, and a lens (a condensing lens) 45.

The housing 41 houses the optical scanning section and the lens 43. The housing 41 forms a dust-proof/drip-proof structure.

The optical fiber 7 is attached to the housing 41 via the condensing-position changing mechanism 44. The condensing-position changing mechanism 44 is explained below.

Further, the lens 45 is attached to the housing 41. The lens 45 forms a part of (a part of a wall section of) the housing 41. Consequently, it is possible to suppress the number of components and attain a reduction in the size of the device. The lens 45 is explained below.

The optical scanning section 42 is an optical scanner that two-dimensionally scans signal light from the signal-light generating section 31. Scanning light is formed by scanning the signal light with the optical scanning section 42.

The optical scanning section 42 includes, as shown in FIG. 7, a movable mirror section 11, a pair of shaft sections 12a and 12b (first shaft sections), a frame body section 13, two pairs of shaft sections 14a, 14b, 14c, and 14d (second shaft sections), a supporting section 15, a permanent magnet 16, and a coil 17. In other words, the optical scanning section 42 has a so-called gimbal structure.

The movable mirror section 11 and the pair of shaft sections 12a and 12b configure a first vibration system that swings (reciprocatingly turns) around a Y1 axis (a first axis). The movable mirror section 11, the pair of shaft sections 12a, 12b, the frame body section 13, the two pairs of shaft sections 14a, 14b, 14c, and 14d, and the permanent magnet 16 configure a second vibration system that swings (reciprocatingly turns) around an X1 axis (a second axis).

The optical scanning section 42 includes a signal superimposing section 18 (see FIG. 6). The permanent magnet 16, the coil 17, the signal superimposing section 18, and the driving-signal generating section 32 configure a driving section that drives the first vibration system and the second vibration system (i.e., swings the movable mirror section 11 around the X1 axis and the Y1 axis).

The sections of the optical scanning section 42 are explained in detail below in order.

The movable mirror section 11 includes a base section 111 (a movable section) and a light reflection plate 113 fixed to the base section 111 via a spacer 112.

A light reflecting section 114 having light reflectivity is provided on the upper surface (one surface) of the light reflection plate 113.

The light reflection plate 113 is separated from the shaft sections 12a and 12b in the thickness direction and provided to overlap the shaft sections 12a and 12b when viewed from the thickness direction (hereinafter also referred to as "plan view").

Therefore, it is possible to increase an area of a plate surface of the light reflection plate 113 while reducing the distance between the shaft section 12a and the shaft section 12b. Since the distance between the shaft section 12a and the shaft section 12b can be reduced, it is possible to attain a reduction in size of the frame body section 13. Further, since it is possible to attain a reduction in size of the frame body section 13, it is possible to reduce the distance between the shaft sections 14a and 14b and the shaft sections 14c and 14d.

Consequently, even if the area of the plate surface of the light reflection plate 113 is increased, it is possible to attain a reduction in size of the optical scanning section 42. In other words, it is possible to reduce the size of the optical scanning section 42 with respect to the area of the light reflecting section 114.

The light reflecting plate 113 is formed to cover the entire shaft sections 12a and 12b in plan view. In other words, each of the shaft sections 12a and 12b is located on the inner side with respect to the outer circumference of the light reflection plate 113 in plan view. Consequently, the area of the plate surface of the light reflection plate 113 increases. As a result, the area of the light reflecting section 114 can be increased. Further, it is possible to prevent unnecessary light from being reflected by the shaft sections 12a and 12b to change to stray light.

The light reflection plate 113 is formed to cover the entire frame body section 13 in plan view. In other words, the frame body section 13 is located on the inner side with respect to the outer circumference of the light reflection plate 113 in plan view. Consequently, the area of the plate surface of the light reflection plate 113 increases. As a result, the area of the light reflecting section 114 can be increased. Further, it is possible to prevent unnecessary light from being reflected by the frame body section 13 to change to stray light.

Further, the light reflection plate 113 is formed to cover the entire shaft sections 14a, 14b, 14c, and 14d in plan view. In other words, each of the shaft sections 14a, 14b, 14c, and 14d is located on the inner side with respect to the outer circumference of the light reflection plate 113 in plan view. Consequently, the area of the plate surface of the light reflection plate 113 increases. As a result, the area of the light reflecting section 114 can be increased. Further, it is possible to prevent unnecessary light from being reflected by the shaft sections 14a, 14b, 14c, and 14d to change to stray light.

In this embodiment, the light reflection plate 113 is formed in a circular shape in plan view. The plan view shape of the light reflection plate 113 is not limited to this and may be, for example, a polygonal shape, an elliptical shape, a square shape, or another shape.

As shown in FIG. 8, a hard layer 115 is provided on the lower surface (the other surface) of the light reflection plate 113.

The hard layer 115 is formed of a material harder than the material forming the main body of the light reflection plate 113. Consequently, it is possible to improve the rigidity of the light reflection plate 113. Therefore, it is possible to prevent or suppress bending during the swing of the light reflection plate 113. Further, it is possible to reduce the thickness of the light reflection plate 113 and suppress a moment of inertia during the swing around the X1 axis and the Y1 axis of the light reflection plate 113.

The material forming the hard layer 115 is not specifically limited as long as the material is harder than the material forming the main body of the light reflection plate 113. For example, diamond, a carbon nitride film, quartz, sapphire, lithium tantalate, and potassium niobate can be used. In particular, it is preferable to use diamond.

The thickness (average) of the hard layer 115 is not specifically limited. However, the thickness of the hard layer 115 is preferably about 1 to 10 μm and more preferably about 1 to 5 μm.

The hard layer 115 may be formed by a single layer or may be formed by a laminated body of a plurality of layers. The hard layer 115 is provided according to necessity and can be omitted.

For the formation of the hard layer 115, for example, chemical vapor deposition (CVD) such as plasma CVD, thermal CVD, and laser CVD, vacuum evaporation, sputtering, a dry-type plating method such as ion plating, a wet-type plating method such as electroplating, immersion plating, and electroless plating, thermal spraying, and joining of a sheet-like member can be used.

The lower surface of the light reflection plate 113 is fixed to the base section 111 via the spacer 112. Consequently, it is possible to swing the light reflection plate 113 around the Y1 axis while preventing contact with the shaft sections 12a and 12b, the frame body section 13, and the shaft sections 14a, 14b, 14c, and 14d.

The base section 111 is located on the inner side with respect to the outer circumference of the light reflection plate 113 in plan view. That is, the area of the surface (the plate surface) of the light reflection plate 113 on which the light reflecting section 114 is provided is larger than the area of the surface of the base section 111 on which the spacer 112 is fixed. The area in a plan view of the base section 111 is preferably as small as possible as long as the base section 111 can support the light reflection plate 113 via the spacer 112. Consequently, it is possible to reduce the distance between the shaft section 12a and the shaft section 12b while increasing the area of the plate surface of the light reflection plate 113.

As shown in FIG. 7, the frame body section 13 is formed in a frame shape and is provided to surround the base section 111 of the movable mirror section 11. In other words, the base section 111 of the movable mirror section 11 is provided on the inner side of the frame body section 13 formed in the frame shape.

The frame body section 13 is supported by the supporting section 15 via the shaft sections 14a, 14b, 14c, and 14d. The base section 111 of the movable mirror section 11 is supported by the frame body section 13 via the shaft sections 12a and 12b.

The length in a direction along the Y1 axis of the frame body section 13 is larger than the length in a direction along the X1 axis. That is, when the length of the frame body section 13 in the direction along the Y1 axis is represented as "a" and the length of the frame body section 13 in the direction along the X1 axis is represented as "b", a relation a>b is satisfied. Consequently, it is possible to suppress the length of the optical scanning section 42 in the direction along the X1 axis while securing length necessary for the shaft sections 12a and 12b.

The frame body section 13 is formed in a shape extending along the outer shape of a structure formed by the base section 111 of the movable mirror section 11 and the pair of shaft sections 12a and 12b in plan view. Consequently, it is possible to attain a reduction in size of the frame body section 13 while allowing vibration of the first vibration system configured by the movable mirror section 11 and the pair of shaft sections 12a and 12b, that is, vibration around the Y1 axis of the movable mirror section 11.

The shape of the frame body section 13 is not limited to the shape shown in the figure as long as the shape is a frame shape that surrounds the base section 111 of the movable mirror section 11.

Each of the shaft sections 12a and 12b and the shaft sections 14a, 14b, 14c, and 14d is elastically deformable.

The shaft sections 12a and 12b couple the movable mirror section 11 and the frame body section 13 to enable the movable mirror section 11 to pivot (swing) around the Y1 axis (the first axis). The shaft sections 14a, 14b, 14c, and 14d couple the frame body section 13 and the supporting section 15 to enable the frame body section 13 to pivot (swing) around the X1 axis (the second axis) orthogonal to the Y1 axis.

The shaft sections 12a and 12b are arranged to be opposed to each other via the base section 111 of the movable mirror section 11. Each of the shaft sections 12a and 12b is formed in a longitudinal shape extending in the direction along the Y1 axis. One end of each of the shaft sections 12a and 12b is connected to the base section 111 and the other end is connected to the frame body section 13. Each of the shaft sections 12a and 12b is arranged such that the center axis thereof coincides with the Y1 axis.

Each of the shaft sections 12a and 12b is torsionally deformed according to the swing around the Y1 axis of the movable mirror section 11.

The shaft sections 14a and 14b and the shaft sections 14c and 14d are arranged to be opposed to each other via (across) the frame body section 13. Each of the shaft sections 14a, 14b, 14c, and 14d is formed in a longitudinal shape extending in the direction along the X1 axis. One end of each of the shaft sections 14a, 14b, 14c, and 14d is connected to the frame body section 13 and the other end is connected to the supporting section 15. The shaft sections 14a and 14b are arranged to be opposed to each other via the X1 axis. Similarly, the shaft sections 14c and 14d are arranged to be opposed to each other via the X1 axis.

In such shaft sections 14a, 14b, 14c, and 14d, each of the entire shaft sections 14a and 14b and the entire shaft sections 14c and 14d are torsionally deformed according to the swing around the X1 axis of the frame body section 13.

In this way, the movable mirror section 11 is enabled to swing around the Y1 axis and the frame body section 13 is enabled to swing around the X1 axis. Consequently, it is possible to swing (reciprocatingly pivot) the movable mirror section 11 around the two axes, i.e., the X1 axis and the Y1 axis orthogonal to each other.

An angle detection sensor such as a distortion sensor is provided in each of at least one of the shaft sections 12a and 12b and at least one of the shaft sections 14a, 14b, 14c, and 14d. The angle detection sensor can detect angle information of the optical scanning section 42, more specifically, a swing angle around each of the X1 axis and the Y1 axis of the light reflecting section 114. A result of the detection is input to the control section 33 via a cable (not-shown).

The shape of each of the shaft sections 12a and 12b and the shaft sections 14a, 14b, 14c, and 14d is not limited to the shape explained above. For example, the shape may have a bent or curved portion or a branched portion in at least one place near the halfway point of the shaft section.

The base section 111, the shaft sections 12a and 12b, the frame body section 13, the shaft sections 14a, 14b, 14c, and 14d, and the supporting section 15 explained above are integrally formed.

In this embodiment, the base section 111, the shaft sections 12a and 12b, the frame body section 13, the shaft sections 14a, 14b, 14c, and 14d, and the supporting section 15 are formed by etching an SOI substrate in which a first Si layer (a device layer), an $SiO_2$ layer (a box layer), and a second Si layer (a handle layer) are laminated in this order. Consequently, vibration characteristics of the first vibration system and the second vibration system can be made excellent. The SOI substrate can be finely processed by etching. Therefore, if the base section 111, the shaft sections 12a and 12b, the frame body section 13, the shaft sections 14a, 14b, 14c, and 14d, and the supporting sections 15 are formed using the SOI substrate, dimension accuracy of the sections can be made excellent. Further, it is possible to attain a reduction in size of the optical scanning section 42.

Each of the base section 111, the shaft sections 12a and 12b, and the shaft sections 14a, 14b, 14c, and 14d is configured by the first Si layer of the SOI substrate. Consequently, the elasticity of the shaft sections 12a and 12b and the shaft sections 14a, 14b, 14c, and 14d can be made excellent. Further, it is possible to prevent the base section 111 from coming into contact with the frame body section 13 when the base section 111 pivots around the Y1 axis.

Each of the frame body section 13 and the supporting section 15 is configured by a laminated body including the first Si layer, the $SiO_2$ layer, and the second Si layer of the SOI substrate. The rigidity of the frame body section 13 and the supporting section 15 can be made excellent. The $SiO_2$ layer and the second Si layer of the frame body section 13 have not only a function of a rib for improving the rigidity of the frame body section 13 but also a function for preventing the movable mirror section 11 from coming into contact with the permanent magnet 16.

Reflection prevention treatment is preferably applied to the upper surface of the supporting section 15. Consequently, it is possible to prevent unnecessary light irradiated on the supporting section 15 from changing to stray light.

The reflection prevention treatment is not specifically limited. Examples of the reflection prevention treatment include formation of a reflection preventing film (a dielectric multi-layer film), surface roughening treatment, and blacking treatment.

The above forming material and forming method of the base section 111, the shaft sections 12a and 12b, and the shaft sections 14a, 14b, 14c, and 14d are merely examples. The invention is not limited to the described forming material and the forming method.

In this embodiment, the spacer 112 and the light reflection plate 113 are also formed by etching the SOI substrate. The spacer 112 is configured by a laminated body including the $SiO_2$ layer and the second Si layer of the SOI substrate. The light reflection plate 113 is configured by the first Si layer of the SOI substrate.

The spacer 112 and the light reflection plate 113 are formed using the SOI substrate in this way. Consequently, it is possible to easily and highly accurately manufacture the spacer 112 and the light reflection plate 113 joined to each other.

The spacer 112 is joined to the base section 111 by, for example, an adhesive or a joining material such as a solder filler material (not shown in the figure).

The permanent magnet 16 is joined to the lower surface of the frame body section 13 (the surface on the opposite side of the light reflection plate 113).

A joining method for the permanent magnet 16 and the frame body section 13 is not specifically limited. However, for example, a joining method for joining the permanent magnet 16 and the frame body section 13 using an adhesive can be used.

The permanent magnet 16 is magnetized in a direction inclining with respect to the X1 axis and the Y1 axis in plan view.

In this embodiment, the permanent magnet 16 is formed in a longitudinal shape (a bar shape) extending in the direction inclining with respect to the X1 axis and the Y1 axis. The permanent magnet 16 is magnetized in a longitudinal direction thereof. That is, the permanent magnet 16 is magnetized to set one end as the S pole and set the other end as the N pole.

The permanent magnet 16 is provided to be symmetrical with respect to an intersection of the X1 axis and the Y1 axis in plan view.

In an example explained in this embodiment, one permanent magnet is set in the frame body section 13. However, the number of permanent magnets is not limited to this. For example, two permanent magnets may be set in the frame body section 13. In this case, for example, the frame body section 13 only has to be set such that elongated two permanent magnets are opposed to each other via the base section 111 in a plan view and parallel to each other.

An inclination angle θ in a direction of magnetization (an extending direction) of the permanent magnet 16 with respect to the X1 axis is not specifically limited. However, the inclination angle θ is preferably equal to or larger than 30° and equal to or smaller than 60°, more preferably equal to or larger than 45° and equal to or smaller than 60°, and still more preferably 45°. By providing the permanent magnet 16 in this way, it is possible to smoothly and surely pivot the movable mirror section 11 around the X1 axis.

As the permanent magnet 16, for example, a neodymium magnet, a ferrite magnet, a samarium-cobalt magnet, an alnico magnet, and a bond magnet can be suitably used. The permanent magnet 16 is a magnetized hard magnetic body. For example, the permanent magnet 16 is formed by setting an unmagnetized hard magnetic body in the frame body section 13 and then magnetizing the hard magnetic body. This is because, if it is attempted to set the already-magnetized permanent magnet 16 in the frame body section 13, the permanent magnet 16 sometimes cannot be set in a desired position because of the influence of an external magnetic field or a magnetic field of the other components.

The coil 17 is provided right under the permanent magnet 16. That is, the coil 17 is provided to be opposed to the lower surface of the frame body section 13. Consequently, it is possible to cause a magnetic field generated from the coil 17 to efficiently act on the permanent magnet 16. Consequently, it is possible to attain power saving and a reduction in size of the optical scanning section 42.

The coil 17 is electrically connected to the signal superimposing section 18 (see FIG. 6).

When a voltage is applied to the coil 17 by the signal superimposing section 18, a magnetic field having a magnetic flux orthogonal to the X1 axis and the Y1 axis is generated from the coil 17.

The signal superimposing section 18 includes an adder (not shown in the figure) configured to superimpose the first driving signal V1 and the second driving signal V2 and applies a superimposed voltage of the driving signals to the coil 17.

The first driving signal V1 and the second driving signal V2 are explained in detail.

As explained above, the driving circuit 321 generates the first driving signal V1 (the voltage for horizontal scanning) that cyclically changes at the cycle T1 as shown in FIG. 4A.

That is, the driving circuit 321 generates the first driving signal V1 having a first frequency (1/T1).

The first driving signal V1 is formed in a waveform like a sine wave. Therefore, the optical scanning section 42 can effectively perform main scanning of light. The waveform of the first driving signal V1 is not limited to this.

The first frequency (1/T1) is not specifically limited as long as the first frequency is a frequency suitable for horizontal scanning. However, the first frequency is preferably 10 to 40 kHz.

In this embodiment, the first frequency is set to be equal to a torsional resonance frequency (f1) of a first vibration system (a torsional vibration system) configured by the movable mirror section 11 and the pair of shaft sections 12a and 12b. That is, the first vibration system is designed (manufactured) such that the torsional resonance frequency f1 is a frequency suitable for horizontal scanning. Consequently, it is possible to increase a pivoting angle around the Y1 axis of the movable mirror section 11.

On the other hand, as explained above, the driving circuit 322 generates the second driving signal V2 (the voltage for vertical scanning) that cyclically changes at the cycle T2 different from the cycle T1 as shown in FIG. 4B. That is, the driving circuit 322 generates the second driving signal V2 having a second frequency (1/T2).

The second driving signal V2 is formed in a waveform like a sawtooth wave. Therefore, the optical scanning section 42 can effectively vertically scan (sub-scan) light. The waveform of the second driving signal V2 is not limited to this.

The second frequency (1/T2) is not specifically limited as long as the second frequency is a frequency different from the first frequency (1/T1) and suitable for the vertical scanning. However, the second frequency is preferably 30 to 80 Hz (about 60 Hz). In this way, the frequency of the second driving signal V2 is set to about 60 Hz and the frequency of the first driving signal V1 is set to 10 to 40 Hz. Consequently, it is possible to pivot the movable mirror section 11 around each of the two axes (the X1 axis and the Y1 axis) orthogonal to each other at a frequency suitable for rendering on a display. However, a combination of the frequency of the first driving signal V1 and the frequency of the second driving signal V2 is not specifically limited as long as the movable mirror section 11 can be pivoted around each of the X1 axis and the Y1 axis.

In this embodiment, the frequency of the second driving signal V2 is adjusted to be a frequency different from a torsional resonance frequency (a resonance frequency) of the second vibration system (a torsional vibration system) configured by the movable mirror section 11, the pair of shaft sections 12a and 12b, the frame body section 13, the two pairs of shaft sections 14a, 14b, 14c, and 14d, and the permanent magnet 16.

The frequency (the second frequency) of the second driving signal V2 is preferably smaller than the frequency (the first frequency) of the first driving signal V1. That is, the cycle T2 is preferably longer than the cycle T1. Consequently, it is possible to more surely and more smoothly pivot the movable mirror section 11 around the X1 axis at the second frequency while pivoting the movable mirror 11 around the Y1 axis at the first frequency.

When the torsional resonance frequency of the first vibration system is represented as f1 (Hz) and the torsional resonance frequency of the second vibration system is represented as f2 (Hz), f1 and f2 preferably satisfy a relation $f2<f1$ and more preferably satisfy a relation $f1 \geq 10f2$. Consequently, it is possible to more smoothly pivot the movable mirror section 11 around the X1 axis at the frequency of the second driving signal V2 while pivoting the movable mirror section 11 around the Y1 axis at the frequency of the first driving signal V1. On the other hand, if $f1 \leq f2$, it is likely that vibration of the first vibration system due to the second frequency occurs.

Next, a driving method for the optical scanning section 42 will be explained. In this embodiment, as explained above, the frequency of the first driving signal V1 is set equal to the torsional resonance frequency of the first vibration system and the frequency of the second driving signal V2 is set to a value different from the torsional resonance frequency of the second vibration system and to be smaller than the frequency of the first driving signal V1 (e.g., the frequency of the first driving signal V1 is set to 15 kHz and the frequency of the second driving signal V2 is set to 60 Hz).

For example, the first driving signal V1 shown in FIG. 4A and the second driving signal V2 shown in FIG. 4B are superimposed by the signal superimposing section 18 and a superimposed voltage is applied to the coil 17.

Then, a magnetic field about to attract one end (the N pole) of the permanent magnet 16 to the coil 17 and separate the other end (the S pole) of the permanent magnet 16 from the coil 17 (the magnetic field is referred to as "magnetic field A1") and a magnetic field about to separate one end (the N pole) of the permanent magnet 16 from the coil 17 and attract the other end (the S pole) of the permanent magnet 16 to the coil 17 (the magnetic field is referred to as "magnetic field A2") are alternately switched according to the first driving signal V1.

As explained above, the permanent magnet 16 is arranged to locate the respective ends (magnetic poles) in two regions divided by the Y1 axis. That is, in a plan view of FIG. 7, the N pole of the permanent magnet 16 is located on one side across the Y1 axis and the S pole of the permanent magnet 16 is located on the other side. Therefore, when the magnetic field A1 and the magnetic field A2 are alternately switched, vibration having a torsional vibration component around the Y1 axis in the frame body section 13 is excited. According to the vibration, the movable mirror 11 pivots around the Y1 axis at the frequency of the first driving signal V1 while torsionally deforming the shaft sections 12a and 12b.

The frequency of the first driving signal V1 is equal to the torsional resonance frequency of the first vibration system. Therefore, it is possible to efficiently pivot the movable mirror section 11 around the Y1 axis according to the first driving signal V1. That is, even if vibration having the torsional vibration component around the Y1 axis of the frame body section 13 is small, it is possible to increase a pivoting angle around the Y1 axis of the movable mirror 11 involved in the vibration.

On the other hand, a magnetic field about to attract one end (the N pole) of the permanent magnet 16 to the coil 17 and separate the other end (the S pole) of the permanent magnet 16 from the coil 17 (the magnetic field is referred to as "magnetic field B1") and a magnetic field about to separate one end (the N pole) of the permanent magnet 16 from the coil 17 and attract the other end (the S pole) of the permanent magnet 16 to the coil 17 (the magnetic field is referred to as "magnetic field B2") are alternately switched according to the second driving signal V2.

As explained above, the permanent magnet 16 is arranged to locate the respective ends (magnetic poles) in two regions divided by the X1 axis. That is, in a plan view of FIG. 7, the N pole of the permanent magnet 16 is located on one side across the X1 axis and the S pole of the permanent magnet 16 is located on the other side. Therefore, when the magnetic field B1 and the magnetic field B2 are alternately switched, the frame body section 13 pivots around the X1 axis at the frequency of the second driving signal V2 together with the movable mirror section 11 while torsionally deforming the shaft sections 14a and 14b and the shaft sections 14c and 14d.

The frequency of the second driving signal V2 is set extremely low compared with the frequency of the first driving signal V1. The torsional resonance frequency of the second vibration system is designed lower than the torsional resonance frequency of the first vibration system. Therefore, it is possible to prevent the movable mirror section 11 from pivoting around the Y1 axis at the second driving signal V2.

With the optical scanning section 42 explained above, the movable mirror section 11 including the light reflecting section 114 having light reflectivity is swung around each of the two axes orthogonal to each other. Therefore, it is possible to attain a reduction in size and a reduction in weight of the optical scanning section 42.

The signal light (the scanning light) scanned by the optical scanning section 42 is emitted to the outside of the housing 41 via the lens 45.

The lens 45 is provided between the optical scanning section 42 and the reflecting section 6.

The lens 45 is a single lens that condenses signal light from the optical scanning section 42 between the optical scanning section 42 and the reflecting section 6 to convert the signal light reflected by the reflecting section 6 into parallel light. That is, the lens 45 can be considered to configure the imaging-point adjusting section configured to adjust, to convert the signal light reflected by the reflecting section 6 into parallel light, an imaging point (a condensing position) of the signal light according to a position to be scanned. By providing the lens 45, the degree of design freedom of the posture, the shape, and the like of the reflecting section 6 increases.

The lens 45 will now be specifically explained. As shown in FIG. 9, when an imaging point of signal light scanned to a position on a proximal side of the reflecting section 6 by the optical scanning section 42 is represented as FP1, an imaging point of signal light scanned to an intermediate position of the reflecting section 6 by the optical scanning section 42 is represented as FP2, and an imaging point of signal light scanned to a position on a distal side of the reflecting section 6 by the optical scanning section 42 is represented as FP3, the lens 45 satisfies a relation (a distance between the imaging point FP1 and the movable mirror section 11)<(a distance between the imaging point FP2 and the movable mirror section 11)<(a distance between the imaging point FP3 and the movable mirror section 11).

Since the imaging points FP1, FP2, and FP3 are located with respect to the movable mirror section 11, it is possible to convert the signal light reflected by the reflecting section 6 arranged in an inclined state in the direction from the nose side to the ear side of the observer during use into parallel light.

On the other hand, when correction is not performed by the lens 45 and imaging points of the signal light are located in positions P1, P2, and P3 at an equal distance from the movable mirror section 11, since the reflection surface of the reflecting section 6 has a lens effect because of bending and an incident angle of the signal light is inclined with respect to the reflection surface of the reflecting section 6, the scanning light reflected by the reflecting section 6 cannot be converted into parallel light.

An image surface including the imaging points FP1, FP2, and FP3 is inclined with respect to a surface including the positions P1, P2, and P3. Therefore, the lens 45 can be considered to configure an inclined-image-surface forming section that inclines (bends) an imaging surface of the signal light according to a position to be scanned such that the signal light reflected by the reflecting section 6 is converted into parallel light.

The condensing-position converting mechanism 44 will now be explained in detail.

The condensing-position converting mechanism (the condensing-position changing section) 44 shown in FIG. 6 has a function of moving an end face on the optical scanning section 42 side of the optical fiber 7 in an axis direction of the optical fiber 7 to thereby change a condensing position (the imaging point explained above) of signal light. Consequently, it is possible to change (adjust), with a relatively simple and small configuration, a condensing position of scanning light formed by scanning the signal light with the optical scanning section 42 and optimize an image visually recognized by the observer.

The condensing-position changing mechanism 44 includes, as shown in FIG. 10, a male screw member 441 fixed to the optical fiber 7 and a female screw member 442 rotatably supported with respect to the housing 41 and screwed with the male screw member 441.

The condensing-position changing mechanism 44 can move the optical fiber 7 in the axis direction of the optical fiber 7 together with the male screw member 441 by rotating the female screw member 442 with respect to the housing 41.

Signal light emitted from the optical fiber 7 attached to the housing 41 via the condensing-position changing mechanism 44 is made incident on the light reflecting section 114 of the optical scanning section 42 via the lens 43.

The lens 43 has a function of adjusting a spot diameter of the signal light emitted from the optical fiber 7. The lens 43 also has a function of adjusting and substantially parallelizing a radiation angle of the signal light emitted from the optical fiber 7.

Reflecting Section

As shown in FIGS. 1 and 2, the reflecting section 6 is attached to the rim section 25 included in the front section 22 of the frame 2.

That is, the reflecting section 6 is arranged to be located in front of the eye of the observer and on a farther side with respect to the observer than the optical scanning section 42 during use. Consequently, it is possible to prevent a portion projecting to the front side with respect to the face of the observer from being formed on the image display device 1.

The reflecting section 6 has a function of reflecting signal light from the optical scanning section 42 toward the eyes of the observer.

In this embodiment, the reflecting section 6 is a half mirror and also has a function of transmitting external light (translucency or semi-transparency to visible light). That is, the reflecting section 6 has a function of reflecting the signal light from the optical scanning section 42 and transmitting the external light traveling from the outer side of the reflecting section 6 toward the eyes of the observer during use. Consequently, the observer can visually recognize a virtual image (an image) formed by the signal light while visually recognizing an external image. That is, it is possible to realize a see-through type head mounted display.

Specifically, the reflecting section 6 includes a transparent substrate (a light transmitting section) 61 configured to transmit the external light and a diffraction grating 62 supported by the transparent substrate 61 and configured to reflect the signal light from the optical scanning section 42. The reflecting section 6 can be considered a half mirror in itself. A half mirror such as the diffraction grating 62 can be considered to be provided in the transparent substrate 61. Consequently, it is possible to impart various optical characteristics to the diffraction grating 62, reduce the number of components of an optical system, and improve the degree of design freedom. For example, by using a hologram element as the diffraction grating 62, it is possible to adjust an emitting direction of the signal light reflected by the reflecting section 6. By imparting a lens effect to the diffraction grating 62, it is possible to adjust an imaging state of entire scanning light formed by the signal light reflected by the reflecting section 6.

The reflecting section 6 is not limited to the configuration explained above and may be, for example, a reflecting section in which a semitransparent reflecting film configured by a metal thin film, a dielectric multilayer film, or the like is formed on a transparent substrate.

The reflecting section 6 is arranged in a state in which the reflecting section 6 is inclined in a direction from the nose NS side toward the ear EA side of the observer during use with respect to the eye width direction. In other words, the reflecting section 6 has a curved surface shape extending substantially along the contour of the face from the nose NS side toward the ear EA side of the observer during use. Further, in other words, the reflecting section 6 is curved from the nose NS side to the ear EA side of the observer during use. Consequently, it is possible to attain a reduction in size of the image display device 1 and improve designability of the image display device 1. Further, it is possible to easily reflect, with the reflecting section 6, the signal light from the optical scanning section 42 toward the eye EY of the observer during use.

In this embodiment, the reflecting section 6 is formed in a shape curved along the curve of the frame 2. That is, the reflection surface of the reflecting section 6 has a concave curved surface shape.

With the image display device 1 explained above, since the optical scanning section 42 is arranged to be located further on the nose NS side than the eye EY of the observer during use, it is possible to prevent a portion projecting to the lateral side with respect to the face of the observer from being formed. Further, since the reflecting section 6 is located in front of the eye EY of the observer and on the farther side with respect to the observer than the optical scanning section 42, it is possible to prevent a portion projecting to the front side with respect to the face of the observer from being formed. Moreover, since the lens 45 can convert the signal light reflected by the reflecting section 6 into parallel light, the degree of design freedom of the posture, the shape, and the like of the reflecting section 6 increases. Consequently, the image display device 1 can reduce the weight felt by the observer and improve the degree of design freedom.

Second Embodiment

A second embodiment will now be explained.

Figure 11:
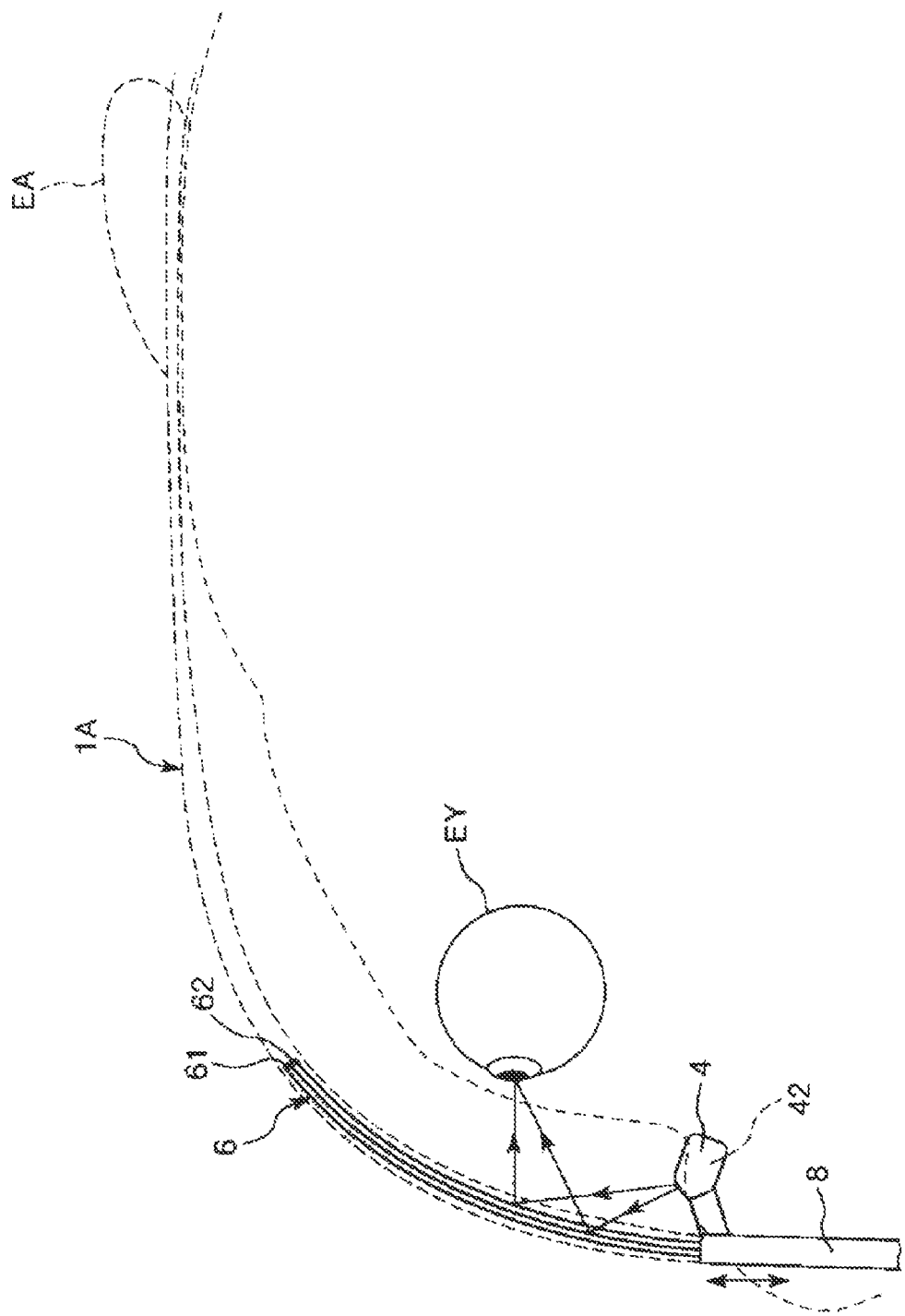
FIG. 11 is a partially enlarged view of an image display device according to a second embodiment.

FIG. 11 is a partially enlarged view of an image display device according to the second embodiment.

Concerning the second embodiment, differences from the first embodiment are mainly explained below. An explanation of similarities is omitted. In FIG. 11, the components that are the same as the components in the first embodiment are denoted by the same reference numerals and signs.

The image display device in this embodiment is the same as the image display device in the first embodiment except that an eye-width-position adjusting section is provided.

An image display device 1A in this embodiment includes an eye-width-position adjusting mechanism 8 (the eye-width-position adjusting section).

The eye-width-position adjusting mechanism 8 is configured to be capable of moving the optical scanning section 42 and the reflecting section 6 as a unit in the eye width direction of an observer during use with respect to the position of the eye EY of the observer. Consequently, it is possible to adjust an imaging position in the eye width direction of the observer while retaining a positional relation between the optical scanning section 42 and the reflecting section 6.

Differences in the eye width (the distance between both the eyes) of humans exist according to race, gender, individuality, and the like. Therefore, when the observer changes, an imaging position of scanning light sometimes shifts in the left right direction (the lateral direction) with respect to the eye EY of the observer. Therefore, the imaging position of the scanning light with respect to the eye EY is adjusted by the eye-width-position adjusting mechanism (the eye-width-position adjusting section) 8.

The eye-width-position adjusting mechanism 8 includes a slide mechanism (not-shown). Consequently, the eye-width-position adjusting mechanism 8 is configured to move the optical scanning section 42 and the reflecting section 6 as a unit in the left right direction (the Z-axis direction) of the head of the observer. By moving the optical scanning section 42 and the reflecting section 6 as a unit, it is possible to keep a projection state of the scanning light from the optical scanning section 42 on the reflecting section 6 constant.

With the image display device 1A in the second embodiment explained above, as in the first embodiment, it is possible to reduce the blurring of an entire image compared with the related art and to improve the display quality of an image visually recognized by the observer.

Third Embodiment

A third embodiment will now be explained.

Figure 12:
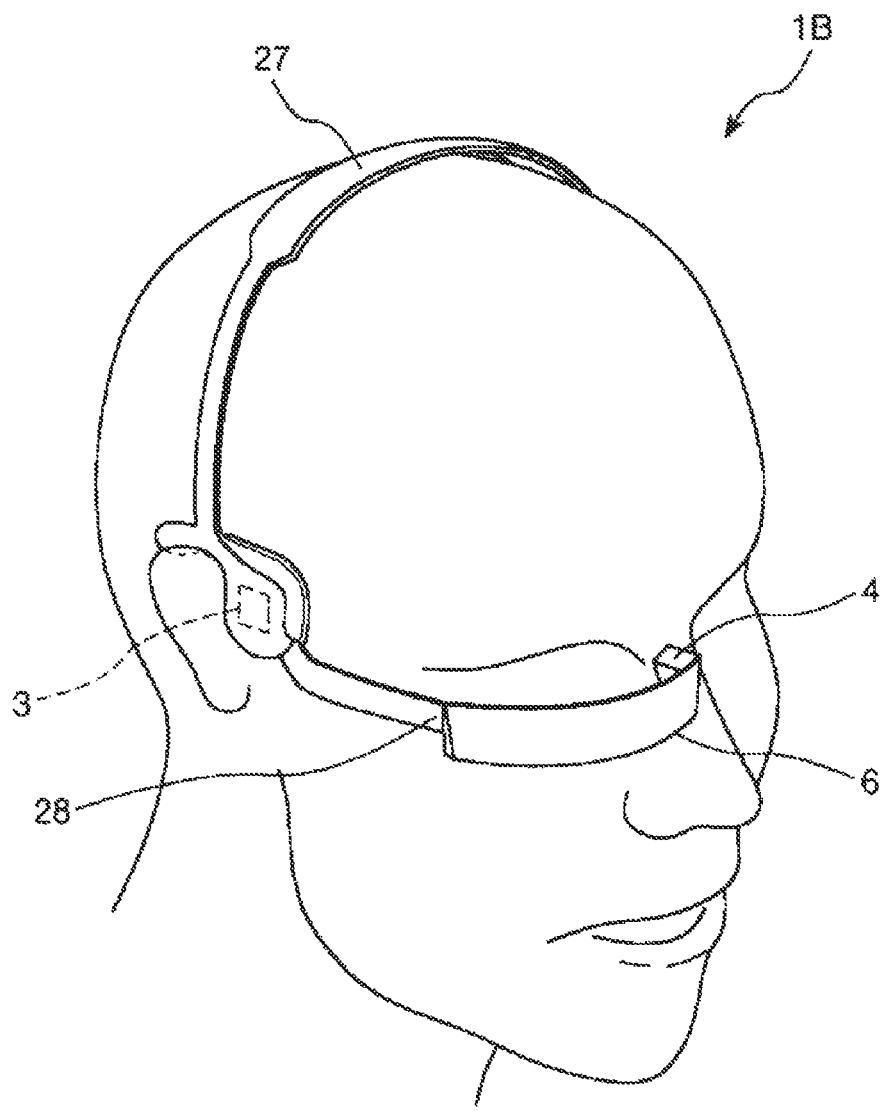
FIG. 12 is a diagram showing an image display device according to a third embodiment.

FIG. 12 is a diagram showing an image display device according to the third embodiment.

Concerning the third embodiment, differences from the first embodiment are mainly explained below. An explanation of the similarities is omitted. In FIG. 12, the components that are the same as the components in the first embodiment are denoted by the same reference numerals and signs.

The image display device in this embodiment is the same as the image display device in the first embodiment except that the image display device is applied to a head-set type head-mounted image display device.

An image display device 1B in this embodiment includes a mounting section 27 mounted on the head of an observer and an extending section 28 extending from the mounting section 27.

The signal generating section 3 is provided in the mounting section 27. The scanning-light emitting section 4 and the reflecting section 6 are attached to the extending section 28.

In the image display device 1B, as in the image display device 1, signal light from the optical scanning section of the scanning-light emitting section 4 is condensed between the optical scanning section and the reflecting section 6 by the condensing lens of the scanning-light emitting section 4. Therefore, it is possible to convert light reflected by the curved reflecting section 6 into parallel light. Consequently, it is possible to guide the parallel signal light to a pupil position of the eye of the observer and image the signal light on the retinas of the observer. Therefore, it is possible to improve the display quality of an image visually recognized by the observer.

With the image display device 1B in the third embodiment explained above, as in the first embodiment, it is possible to reduce the blurring of an entire image compared with the related art and to improve the display quality of an image visually recognized by the observer.

The image display device and the head-mounted image display device have been explained above on the basis of the embodiments shown in the figures. However, the invention is not so limited. For example, in the image display device, the components can be replaced with arbitrary components having the same functions and other arbitrary components can be added.

The invention may be a combination of two or more arbitrary configurations (characteristics) in the embodiments.

In the example explained in the embodiments, the image display device forms virtual images for the right eye and the left eye. However, the image display device may be configured to form a virtual image for the right eye or the left eye.

In the example explained in the embodiments, the invention is applied to the eyeglass-type and headset-type head-mounted image display devices. However, the invention is not limited to these image display devices as long as an image display device is mountable on the head and can also be applied to, for example, a helmet-type head-mounted image display device.

The entire disclosure of Japanese Patent Application No. 2012-180906 filed Aug. 17, 2012 is expressly incorporated by reference herein in its entirety.

What is claimed is:

1. An image display device mountable on a head of an observer, the image display device comprising:
    a frame including a front section including a nose pad section;
    a light transmitting section supported by the front section and allowing visible light to pass therethrough;
    an optical scanning section receiving signal light modulated according to an image signal and made incident thereon and two-dimensionally scanning the incident signal light toward the light transmitting section;
    a half mirror located on a surface on which the signal light from the optical scanning section of the light transmitting section is made incident and having a curved surface that reflects the signal light from the optical scanning section; and
    a condensing lens located on an optical axis between the optical scanning section and the half mirror and condensing the signal light from the optical scanning section between the optical scanning section and the half mirror to convert the signal light reflected by the half mirror into parallel light, wherein
    the optical scanning section is located on a side of the nose pad section and offset towards a center of the front section relative to an optical axis of the signal light reflected by the half mirror.

2. The image display device according to claim 1, further comprising an optical fiber that guides the signal light to the optical scanning section.

3. The image display device according to claim 2, further comprising:
    a lens that adjusts a radiation angle of the signal light emitted from the optical fiber; and
    a condensing-position changing section that moves an end of the optical fiber located at a side of the lens in an axis direction of the optical fiber to change a condensing position of the signal light between the optical scanning section and the half mirror.

4. The image display device according to claim 2, further comprising a signal-light generating section that generates the signal light, wherein
    the frame includes a temple section connected to the front section and an end cover section, which is an end of the temple section, and
    the signal-light generating section is provided in the end cover section.

5. The image display device according to claim 4, wherein the signal-light generating section includes:
    a plurality of light sources that emit lights having different colors from one another; and
    a combining section that combines the lights from the plurality of light sources, and
    the signal-light generating section emits the lights combined by the combining section as the signal light.

6. The image display device according to claim 1, further comprising a housing that includes the condensing lens, wherein
    the optical scanning section is housed in the housing.

7. The image display device according to claim 1, wherein the optical scanning section is attached to the frame and is movable with respect to the half mirror.

8. The image display device according to claim 1, wherein the optical scanning section includes an optical scanner that swings a movable section, which includes a light reflecting section having light reflectivity, around each of two orthogonal axes.

9. The image display device according to claim 8, wherein the optical scanning section includes a gimbal structure including the movable section and a frame body section surrounding the movable section.

10. The image display device according to claim 9, wherein the optical scanning section includes a light reflection plate provided in the movable section and in which the light reflecting section having an area larger than the area of the movable section is formed.

11. The image display device according to claim 1, wherein the curved surface that reflects the signal light from the optical scanning section of the half mirror is a concave surface.

12. The image display device according to claim 1, wherein the half mirror is a diffraction grating.

13. The image display device according to claim 1, wherein the optical scanning section and the half mirror are movable with respect to the frame as a unit.

14. An image display device that is used while being mounted on a head of an observer, the image display device comprising:
    an optical scanning section two-dimensionally scanning signal light modulated according to an image signal;
    a reflecting section located in front of an eye of the observer during use and having a curved surface that reflects the signal light from the optical scanning section toward the eye of the observer; and
    a condensing lens located on an optical axis between the optical scanning section and the reflecting section and condensing the signal light from the optical scanning section between the optical scanning section and the reflecting section to convert the signal light reflected by the reflecting section into parallel light, wherein
    the optical scanning section is arranged in a position closer to the observer during use than the reflecting section and in a position between both eyes of the observer during use.

15. The image display device according to claim 14, further comprising an optical fiber that guides the signal light to the optical scanning section.

16. The image display device according to claim 15, further comprising:

a lens that adjusts a radiation angle of the signal light emitted from the optical fiber; and a condensing-position changing section that moves an end of the optical fiber located at a side of the lens in an axis direction of the optical fiber to change a condensing position of the signal light between the optical scanning section and the reflecting section.

17. The image display device according to claim 15, further comprising a signal-light generating section that generates the signal light, wherein the signal-light generating section is arranged in a position on an opposite side of the eye with respect to an ear of the observer during use.

18. The image display device according to claim 17, wherein the signal-light generating section includes:

a plurality of light sources that emit lights having different colors from one another; and a combining section that combines the lights from the plurality of light sources, and the signal-light generating section emits the lights combined by the combining section as the signal light.

19. The image display device according to claim 14, further comprising a housing that includes the condensing lens, wherein the optical scanning section is housed in the housing.

20. The image display device according to claim 14, further comprising a frame including a nose pad section that comes into contact with a nose of the observer during use, wherein the optical scanning section is attached to the frame and is movable with respect to the reflecting section.

21. The image display device according to claim 14, wherein the optical scanning section includes an optical scanner that swings a movable section, which includes a light reflecting section having light reflectivity, around each of two orthogonal axes.

22. The image display device according to claim 21, wherein the optical scanning section includes a gimbal structure including the movable section and a frame body section surrounding the movable section.

23. The image display device according to claim 22, wherein the optical scanning section includes a light reflection plate provided in the movable section and in which the light reflecting section having an area larger than the area of the movable section is formed.

24. The image display device according to claim 14, wherein the reflecting section is curved from a side of a nose toward a side of an ear of the observer during use.

25. The image display device according to claim 14, wherein the reflecting section reflects the signal light from the optical scanning section and transmits external light traveling from an outer side of the reflecting section to the eye of the observer during use.

26. The image display device according to claim 25, wherein the reflecting section includes:

a transparent substrate that transmits the external light; and a diffraction grating supported by the transparent substrate and reflecting the signal light from the optical scanning section.

27. The image display device according to claim 14, wherein the optical scanning section and the reflecting section are movable as a unit in an eye width direction of the observer during use.

28. A head-mounted image display device comprising:

a light transmitting section allowing visible light to pass therethrough;

an optical scanning section receiving signal light modulated according to an image signal and made incident thereon and two-dimensionally scanning the incident signal light toward the light transmitting section;

a half mirror located on a surface on which the signal light from the optical scanning section of the light transmitting section is made incident and having a curved surface that reflects the signal light from the optical scanning section; and a condensing lens located on an optical axis between the optical scanning section and the half mirror and condensing the signal light from the optical scanning section between the optical scanning section and the half mirror to convert the signal light reflected by the half mirror into parallel light, wherein the optical scanning section is located on a side of the nose pad section and offset towards a center of the front section relative to an optical axis of the signal light reflected by the half mirror.

29. A head-mounted image display device comprising:

a light transmitting section allowing visible light to pass therethrough;

an optical scanning section receiving signal light modulated according to an image signal and made incident thereon and two-dimensionally scanning the incident signal light toward the light transmitting section;

a half mirror located on a surface on which the signal light from the optical scanning section of the light transmitting section is made incident and having a curved surface that reflects the signal light from the optical scanning section; and an image-formation-point adjusting section located on an optical axis between the optical scanning section and the half mirror and adjusting an image formation point of the signal light from the optical scanning section located between the optical scanning section and the half mirror to convert the signal light reflected by the half mirror into parallel light, wherein the optical scanning section is located on a side of the nose pad section and offset towards a center of the front section relative to an optical axis of the signal light reflected by the half mirror.

* * * * *